(12) United States Patent
Kurganov

(10) Patent No.: US 6,807,257 B1
(45) Date of Patent: Oct. 19, 2004

(54) COMPUTER, INTERNET AND TELECOMMUNICATIONS BASED NETWORK

(75) Inventor: Alex Kurganov, Buffalo Grove, IL (US)

(73) Assignee: Webley Systems, Inc., Deerfield, IL (US)

( * ) Notice: Subject to any disclaimer, the term of this patent is extended or adjusted under 35 U.S.C. 154(b) by 0 days.

(21) Appl. No.: 09/260,279

(22) Filed: Mar. 2, 1999

Related U.S. Application Data

(63) Continuation-in-part of application No. 09/033,335, filed on Mar. 2, 1998, now Pat. No. 6,775,264.
(60) Provisional application No. 60/040,056, filed on Mar. 3, 1997.

(51) Int. Cl.[7] .............................................. H04M 1/64

(52) U.S. Cl. ................ 379/88.22; 379/67.1; 379/88.12; 379/88.17; 379/88.18; 379/88.19; 379/72

(58) Field of Search ........................... 379/67.1, 68, 74, 379/83, 88.13, 88.17, 88.18, 88.22, 88.26, 88.27, 201.01, 201.02, 201.03, 205.01, 211.02, 212.02, 265.09, 902, 907, 908; 704/260, 270, 271, 275

(56) References Cited

U.S. PATENT DOCUMENTS

| | | | |
|---|---|---|---|
| 4,313,035 A | 1/1982 | Jordan et al. ........... 379/211.02 |
| 4,585,906 A | 4/1986 | Matthews et al. ........ 379/88.26 |
| 4,596,900 A | 6/1986 | Jackson ....................... 179/2 A |
| 4,696,028 A | 9/1987 | Morganstein et al. .... 379/88.24 |
| 4,757,525 A | 7/1988 | Matthews et al. ............. 379/89 |
| 4,761,807 A | 8/1988 | Matthews et al. ........ 379/88.26 |
| 4,776,016 A | 10/1988 | Hansen ......................... 381/42 |
| 4,809,321 A | 2/1989 | Morganstein et al. .. 379/209.01 |
| 4,837,798 A | 6/1989 | Cohen et al. .................. 379/88 |
| 4,850,012 A | 7/1989 | Mehta et al. ................ 379/157 |
| 4,873,719 A | 10/1989 | Reese ..................... 379/215.01 |
| 4,907,079 A | 3/1990 | Turner et al. .................. 358/84 |
| 4,922,526 A | 5/1990 | Morganstein et al. ....... 379/157 |
| 4,933,966 A | 6/1990 | Hird et al. ................... 379/132 |
| 4,935,958 A | 6/1990 | Morganstein et al. ....... 379/372 |
| 4,953,204 A | 8/1990 | Cuschleg, Jr. et al. .. 379/266.05 |
| 4,955,047 A | 9/1990 | Morganstein et al. ....... 379/198 |
| 4,956,835 A | * 9/1990 | Grover ........................ 370/16 |
| 4,972,462 A | 11/1990 | Shibata .................... 379/88.13 |
| 4,975,941 A | 12/1990 | Morganstein et al. .... 379/88.23 |
| 4,994,926 A | 2/1991 | Gordon et al. .............. 358/400 |
| 5,020,095 A | 5/1991 | Morganstein et al. .... 379/88.23 |
| 5,027,384 A | 6/1991 | Morganstein ............ 379/88.23 |
| 5,029,196 A | 7/1991 | Morganstein ............ 379/88.23 |
| 5,086,385 A | 2/1992 | Launey et al. .............. 364/188 |
| 5,099,509 A | 3/1992 | Morganstein et al. ......... 379/84 |
| 5,109,405 A | 4/1992 | Morganstein ............ 379/88.21 |
| 5,131,024 A | 7/1992 | Pugh et al. .............. 379/88.24 |

(List continued on next page.)

OTHER PUBLICATIONS

Don Hunt and Brian Edwards "Long–Distance Remote Contgrol to the Rescue." CHICAGO TRIBUNE, Jun. 15, 2002, Section 4, p. 15.

Primary Examiner—Allan Hoosain
(74) Attorney, Agent, or Firm—Jenkens & Gilchrist

(57) ABSTRACT

A method and apparatus for a computer and telecommunication network which can receive, send and manage information from or to a subscriber of the network, based the subscriber's configuration. The network is made up of at least one cluster containing voice servers which allow for telephony, speech recognition, text-to-speech and conferencing functions, and is accessible by the subscriber through standard telephone connections or through internet connections. The network also utilizes a database and file server allowing the subscriber to maintain and manage certain contact lists and administrative information. A web server is also connected to the cluster thereby allowing access to all functions through internet connections.

29 Claims, 27 Drawing Sheets

U.S. PATENT DOCUMENTS

| | | | |
|---|---|---|---|
| 5,146,452 A | 9/1992 | Pekarske | 370/16 |
| 5,166,974 A | 11/1992 | Morganstein et al. | 379/67.1 |
| 5,195,086 A | 3/1993 | Baumgartner et al. | 370/264 |
| 5,233,600 A | 8/1993 | Pekarske | 370/14 |
| 5,243,645 A | 9/1993 | Bissell et al. | 379/211.02 |
| 5,249,219 A | 9/1993 | Morganstein et al. | 379/84 |
| 5,263,084 A | 11/1993 | Chaput et al. | 379/215.01 |
| 5,291,302 A | 3/1994 | Gordon et al. | 358/400 |
| 5,303,298 A | 4/1994 | Morganstein et al. | 379/88.23 |
| 5,309,504 A | 5/1994 | Morganstein | 379/67.1 |
| 5,325,421 A * | 6/1994 | Hou et al. | 379/67.1 |
| 5,327,486 A | 7/1994 | Wolff et al. | 379/93.23 |
| 5,327,529 A | 7/1994 | Fults et al. | 395/155 |
| 5,329,578 A | 7/1994 | Brennan et al. | 379/211.03 |
| 5,333,266 A | 7/1994 | Boaz et al. | 709/206 |
| 5,347,574 A | 9/1994 | Morganstein | 379/207.15 |
| 5,355,403 A | 10/1994 | Richardson, Jr. et al. | 379/88.26 |
| 5,365,524 A * | 11/1994 | Hiller et al. | 370/94.2 |
| 5,375,161 A | 12/1994 | Fuller et al. | 455/417 |
| 5,384,771 A | 1/1995 | Isidoro et al. | 370/254 |
| 5,404,231 A | 4/1995 | Bloomfield | 358/400 |
| 5,408,526 A | 4/1995 | McFarland et al. | 379/202.01 |
| 5,414,754 A | 5/1995 | Pugh et al. | 379/88.23 |
| 5,436,963 A | 7/1995 | Fitzpatrick et al. | 379/218.01 |
| 5,459,584 A | 10/1995 | Gordon et al. | 358/400 |
| 5,463,684 A | 10/1995 | Morduch et al. | 379/202.01 |
| 5,475,791 A | 12/1995 | Schalk et al. | 395/2.42 |
| 5,495,484 A * | 2/1996 | Self et al. | 370/110.01 |
| 5,497,373 A | 3/1996 | Hulen et al. | 370/79 |
| 5,499,288 A | 3/1996 | Hunt et al. | 379/88 |
| 5,517,558 A | 5/1996 | Schalk | 379/88 |
| 5,555,100 A | 9/1996 | Bloomfield et al. | 358/402 |
| 5,559,611 A | 9/1996 | Bloomfield et al. | 358/407 |
| 5,566,236 A | 10/1996 | MeLampy et al. | 379/10.01 |
| 5,603,031 A | 2/1997 | White et al. | 709/317 |
| 5,608,786 A | 3/1997 | Gordon | 379/100 |
| 5,610,970 A | 3/1997 | Fuller et al. | 455/417 |
| 5,611,031 A | 3/1997 | Hertzfeld et al. | 345/740 |
| 5,652,789 A * | 7/1997 | Miner et al. | 379/201 |
| 5,659,597 A | 8/1997 | Bareis et al. | 455/563 |
| 5,666,401 A | 9/1997 | Morganstein et al. | 379/67.1 |
| 5,675,507 A * | 10/1997 | Bobo, II | 364/514 R |
| 5,675,811 A | 10/1997 | Broedner et al. | 713/323 |
| 5,689,669 A | 11/1997 | Lynch et al. | 345/848 |
| 5,692,187 A | 11/1997 | Goldman et al. | 707/203 |
| 5,719,921 A | 2/1998 | Vystosky et al. | 379/88 |
| 5,724,408 A | 3/1998 | Morganstein | 379/88.2 |
| 5,742,905 A * | 4/1998 | Pepe et al. | 455/461 |
| 5,752,191 A | 5/1998 | Fuller et al. | 455/445 |
| 5,787,298 A | 7/1998 | Broedner et al. | 713/323 |
| 5,793,993 A | 8/1998 | Broedner et al. | 710/106 |
| 5,809,282 A | 9/1998 | Cooper et al. | 395/500 |
| 5,812,796 A | 9/1998 | Broedner et al. | 710/302 |
| 5,819,306 A | 10/1998 | Goldman et al. | 711/100 |
| 5,867,494 A | 2/1999 | Krishnaswamy et al. | 370/352 |
| 5,867,495 A | 2/1999 | Elliott et al. | 370/352 |
| 5,873,080 A | 2/1999 | Coden et al. | 707/3 |
| 5,881,134 A | 3/1999 | Foster et al. | 379/88 |
| 5,884,262 A * | 3/1999 | Wise et al. | 704/270 |
| 5,890,123 A | 3/1999 | Brown et al. | 704/275 |
| 5,915,001 A * | 6/1999 | Uppaluru | 379/88.22 |
| 5,974,413 A | 10/1999 | Beauregard et al. | 707/6 |
| 5,999,525 A | 12/1999 | Krishnaswamy et al. | 370/352 |
| 6,012,088 A | 1/2000 | Li et al. | 709/219 |
| 6,014,437 A * | 1/2000 | Acker et al. | 379/219 |
| 6,018,710 A * | 1/2000 | Wynblatt et al. | 704/260 |
| 6,021,181 A | 2/2000 | Miner et al. | 379/201 |
| 6,031,904 A | 2/2000 | An et al. | 379/201 |
| 6,038,305 A | 3/2000 | McAllister et al. | 379/207 |
| 6,047,053 A | 4/2000 | Miner et al. | 379/201 |
| 6,067,516 A | 5/2000 | Levay et al. | 704/244 |
| 6,078,580 A | 6/2000 | Mandalia et al. | 370/352 |
| 6,081,518 A | 6/2000 | Bowman-Amuah | 370/352 |
| 6,091,808 A | 7/2000 | Wood et al. | 379/201 |
| 6,104,803 A | 8/2000 | Weser et al. | 379/230 |
| 6,115,742 A | 9/2000 | Franklin et al. | 709/224 |
| 6,208,638 B1 | 3/2001 | Rieley et al. | 370/354 |
| 6,233,318 B1 * | 5/2001 | Picard et al. | 379/88.17 |
| 6,243,373 B1 | 6/2001 | Turock | 370/352 |
| 6,252,944 B1 | 6/2001 | Hansen, II et al. | 379/67.1 |
| 6,269,336 B1 | 7/2001 | Ladd et al. | 704/270 |
| 6,285,745 B1 * | 9/2001 | Bartholomew et al. | 379/88.17 |
| 6,366,578 B1 | 4/2002 | Johnson | 370/353 |
| 6,446,076 B1 | 9/2002 | Burkey et al. | 707/102 |
| 6,477,240 B1 | 11/2002 | Lim et al. | 379/67.1 |
| 6,505,163 B1 | 1/2003 | Zhang et al. | 704/275 |
| 6,546,393 B1 | 4/2003 | Khan | 707/10 |

\* cited by examiner

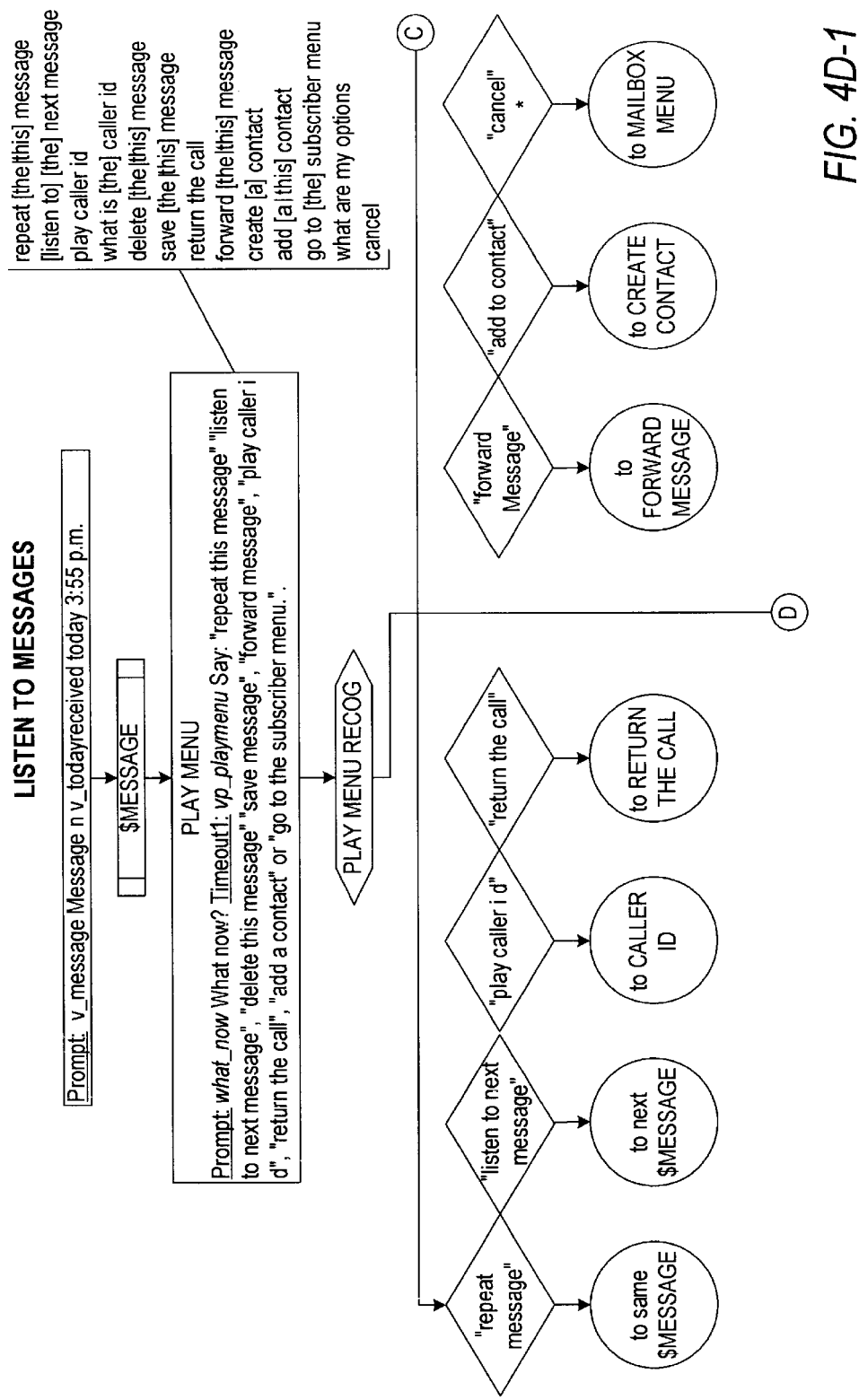

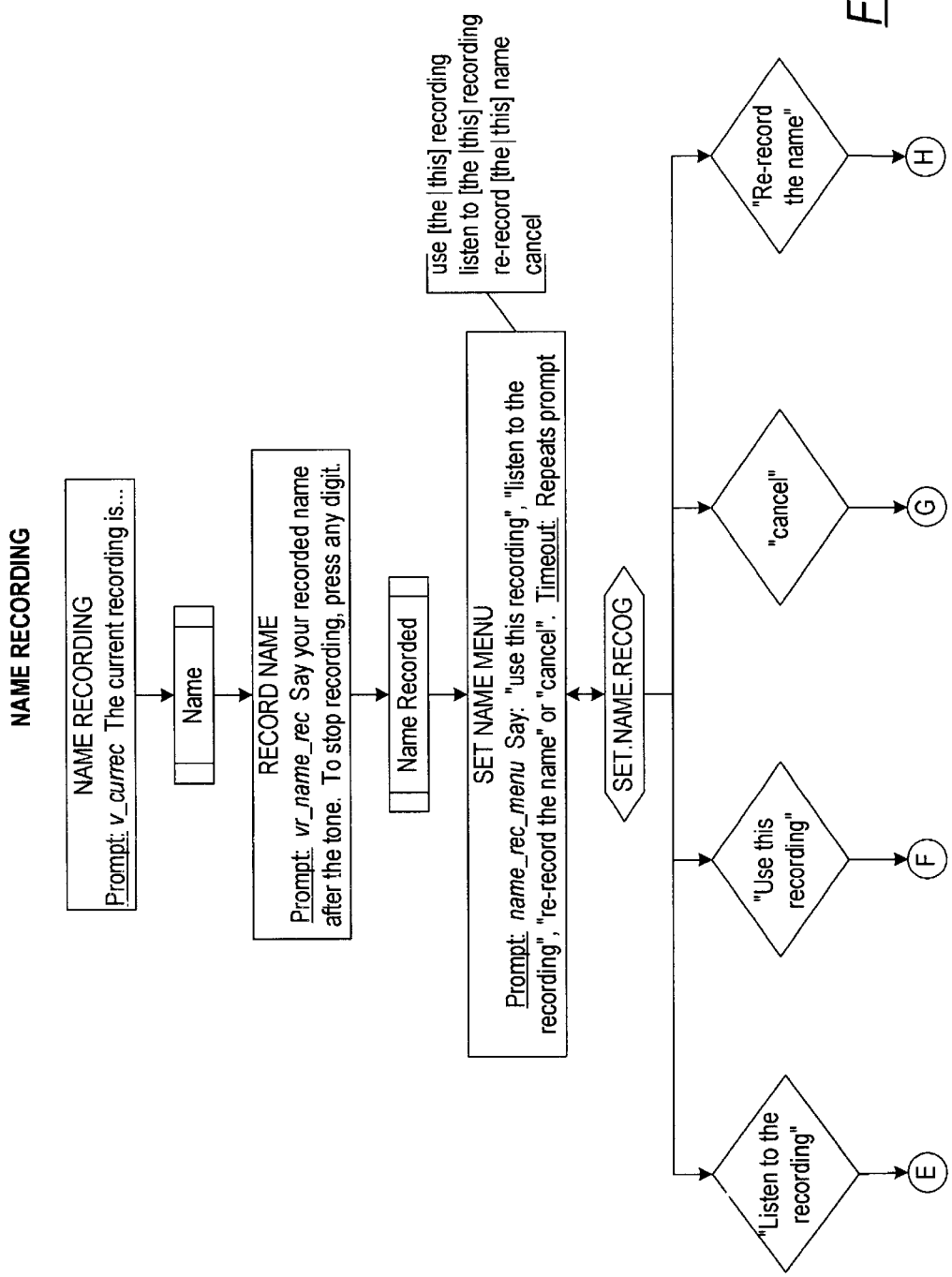

COMPUTER, INTERNET AND TELECOMMUNICATIONS BASED NETWORK

The present patent application is a continuation-in-part application of U.S. patent application Ser. No. 09/033,335 filed on Mar. 2, 1998, now U.S. Pat. No. 6,775,264 which, in turn, is a continued prosecution application based on the provisional patent application Serial. No. 60/040,056, filed Mar. 3, 1997. The present patent application incorporates by reference herein provisional patent application Ser. No. 60/040,056.

COMPUTER PROGRAM LISTING APPENDIX

Compact disks containing a computer program listing are attached to this specification. The computer program listing contained on these compact discs is hereby incorporated by reference into the specification. The appendix comprises one compact disk containing the file "program_listing.txt" which is 1.09 MB in size. This file was created on Nov. 6, 2002 and contains the source code which was part of the provisional application with serial no. 60/040,056 to which this application claims priority. One duplicate copy of this compact disk is also included.

1. Field of the Invention

The present invention relates to a telecommunication system, and more specifically, the present invention relates to a network system based on internet, computer and telecommunication standards, utilizing internet and computer technology, a graphical user interface, integrated telecommunication applications and interactive voice recognition technology, facilitating the computation and telecommunication of voice and electronic data.

2. Background of the Invention

Individuals and business people seek to communicate with each other, obtain useful information, interact commercially and entertain themselves in an increasingly mobile society. In order to fulfill these needs, one requires the ability to send and receive messages, access information and entertainment, conduct business transactions, organize daily schedules and stay in touch with homes and offices from almost anywhere, at any time, as easily as making a telephone call.

Continued demand for products and services that address these needs is evidenced by the increasing number of electronic devices, and the explosive growth of the internet and network services. Advances in wireless telecommunication technologies led to the development of such devices as personal digital assistants, and enabled the growth of paging and cellular telephone networks. Devices such as notebook and sub-notebook computers with modems (both wireline and wireless) have allowed mobile professionals to connect to their PCs from almost any location, as well as to access on-line information and electronic mail services while traveling worldwide.

In addition, communication and information needs have stimulated the growth of the internet, on-line networks and corporate intranets. These networks now host a variety of services such as e-mail, database searching, conferencing, electronic commerce, games, software libraries and electronic newspapers and magazines. However, despite the proliferation of communication devices and the development of the internet, on-line networks and corporate intranets, significant barriers remain to fulfilling user needs for access to and management of personal, professional and public information.

The hardware designs and software technologies which enable today's communication are complex. Information, though widely available, can be either inaccessible or accessible only by navigating through a host of phone systems, operating system platforms, databases and networks. As a result significant amounts of time and effort are required of those who use and depend on these devices, networks and services to communicate and obtain information.

The problem of accessing and processing all of the information available from communication devices, networks and services is particularly acute for mobile business professionals. Today's mobile professional, working out of the home or small office, may have a cellular phone, a pager, a computer, a fax machine, an electronic mailbox on the internet, and a voice-mail service. Whether on the road, in a plane or at the office, success for the mobile professional depends in large part on the ability to easily and quickly access, sort through and respond to the messages delivered to each of these communication devices, and to obtain information necessary to the conduct of business from proliferating networks and services.

SUMMARY OF THE INVENTION

The present invention is a network system, which is based on internet, computing and telecommunications standards, utilizing computer and internet technology, an innovative graphical user interface, integrated communication applications and interactive voice recognition technology. The present invention is a unified messaging service which will be accessible from any standard communication device (telephone, computer or internet), and will give the user intuitive voice command of personal, professional and public information.

This unified messaging service is a useful tool to those whose time and resources are limited and for whom communication is critical, such as mobile business professionals in the small office, home office market. The mobile business professional must maintain access to personal and professional information and developments, respond to customers and communicate with colleagues, family and friends at any time and from any location. The unified messaging service is designed to meet these objectives by offering a single point of access to all communications, integrated with personal information management tools and customized public content delivery.

Small office, home office professionals, most of whom do not have access to dedicated information management systems or the benefit of administrative support staff, may derive unique value from this shared network solution.

BRIEF DESCRIPTION OF THE DRAWINGS

Preferred embodiments of the invention are explained below with references to the accompanying drawings in which.

DETAILED DESCRIPTION OF THE PREFERRED EMBODIMENTS

The present invention is a network system that works, among other things, as your voice-mail system, using an 800/888 number that receives all your calls, faxes, pages and e-mail. The system provides a contact database facilitating the placing of calls, screening of calls, and tracking you down wherever you are.

Regardless of how the message was transmitted, every message is delivered to you through a single source, whether telephone, internet or computer. You can also review your latest call records and billing information and change or add to your phone listings, contact numbers and service preferences through this source.

The present invention utilizes a fault resilient redundant system, residing in two separate sites. There are multiple T-3 (45 Mbps) facilities going into each of those sites. Both sites sit on a fiber-channel fiber optic loop, which is theoretically "self healing" in case of a disaster and can route a phone call to either site, depending on where the route is broken.

Figure 1:
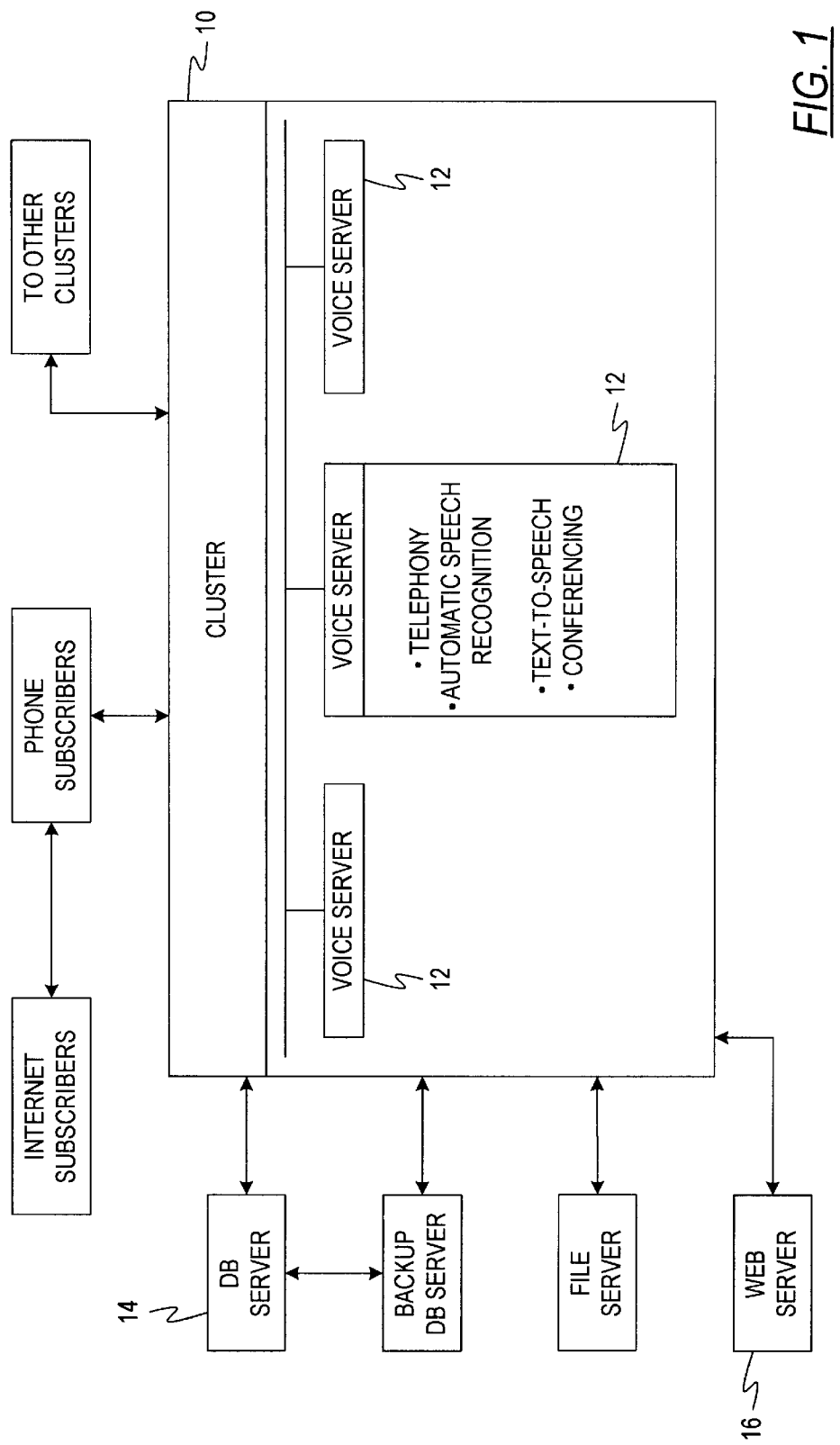
FIG. 1 is a functional block diagram of the hardware platform embodying the present invention.

The configuration at each site is a cluster of servers. FIG. 1 is a block diagram of the hardware platform showing one of these clusters 10 which consists of some voice servers 12, some mirrored Sybase database servers 14, and some web servers 16 where the web access and services are located. The computers (not shown) are 200 MHz Intel-based 1911 rackmount servers running a combination of Solaris and SCO UNIX operating systems. The voice server 12 includes certain functions, such as telephony, automatic speech recognition, text-to-speech, conferencing, etc. Subscribers are connected to these clusters by either normal telephone connections or by internet connections.

Each cluster can serve about 10,000 customers. The system is open-ended allowing for the addition of subscribers as needed. Further the design facilitates the easy addition of hardware and software.

Figure 2:
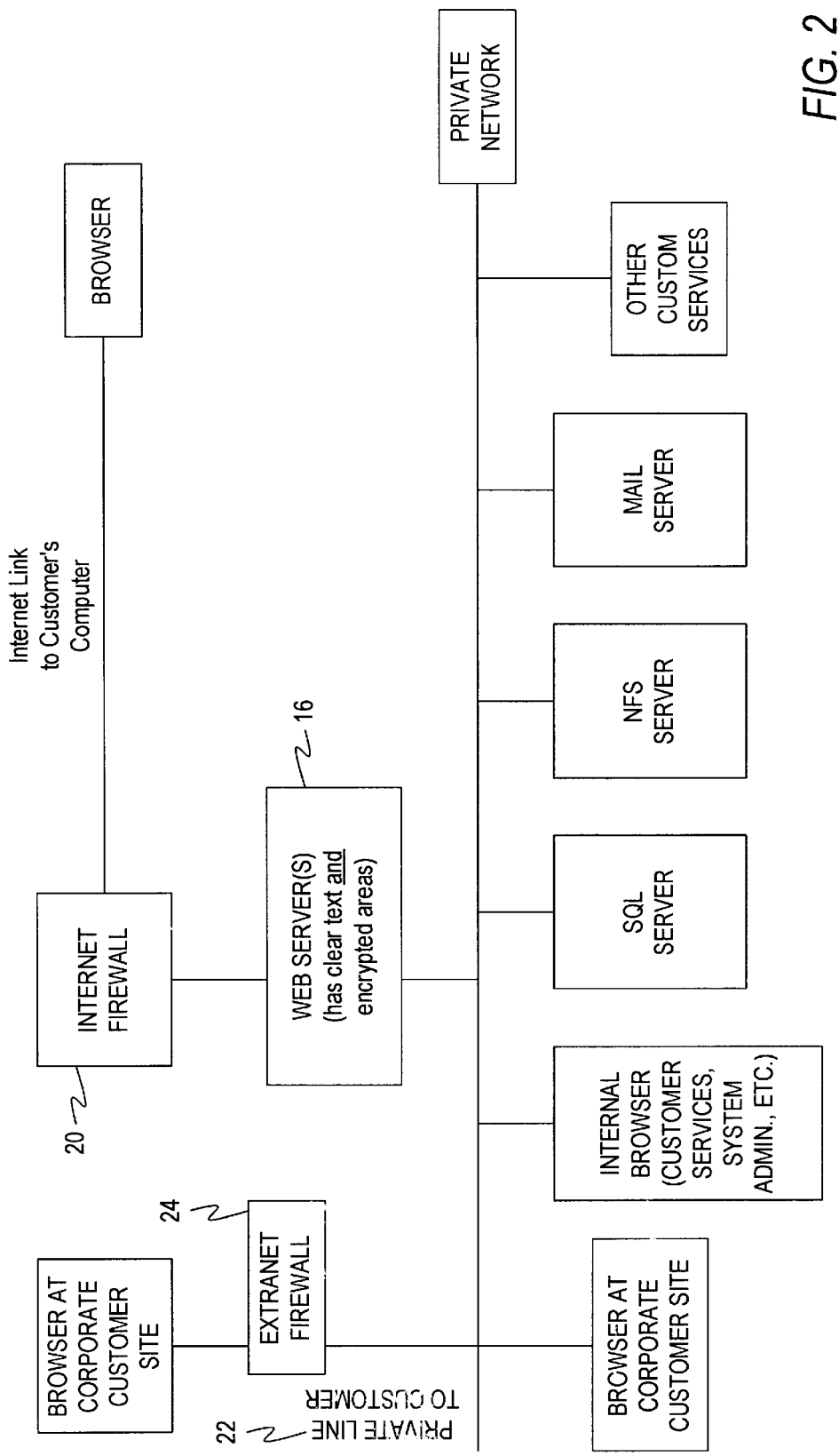
FIG. 2 is a functional block diagram of the internet platform embodying the present invention.

FIG. 2 shows a block diagram of the internet platform. The system may be accessed via the internet instead of a normal telephone connection (voice or touchtone). The subscriber can access the web server 16 through an internet firewall 20. The subscriber merely enters the system's web site and then can access his account through a security program. Once in his account, the subscriber can access various features such as playing voice mail, reading e-mail and faxes, managing contacts and schedules, among other services. Further, the system can provide a private line 22 for corporate and other subscribers which can enter the web server 18 through an extranet firewall 24.

Figure 3:
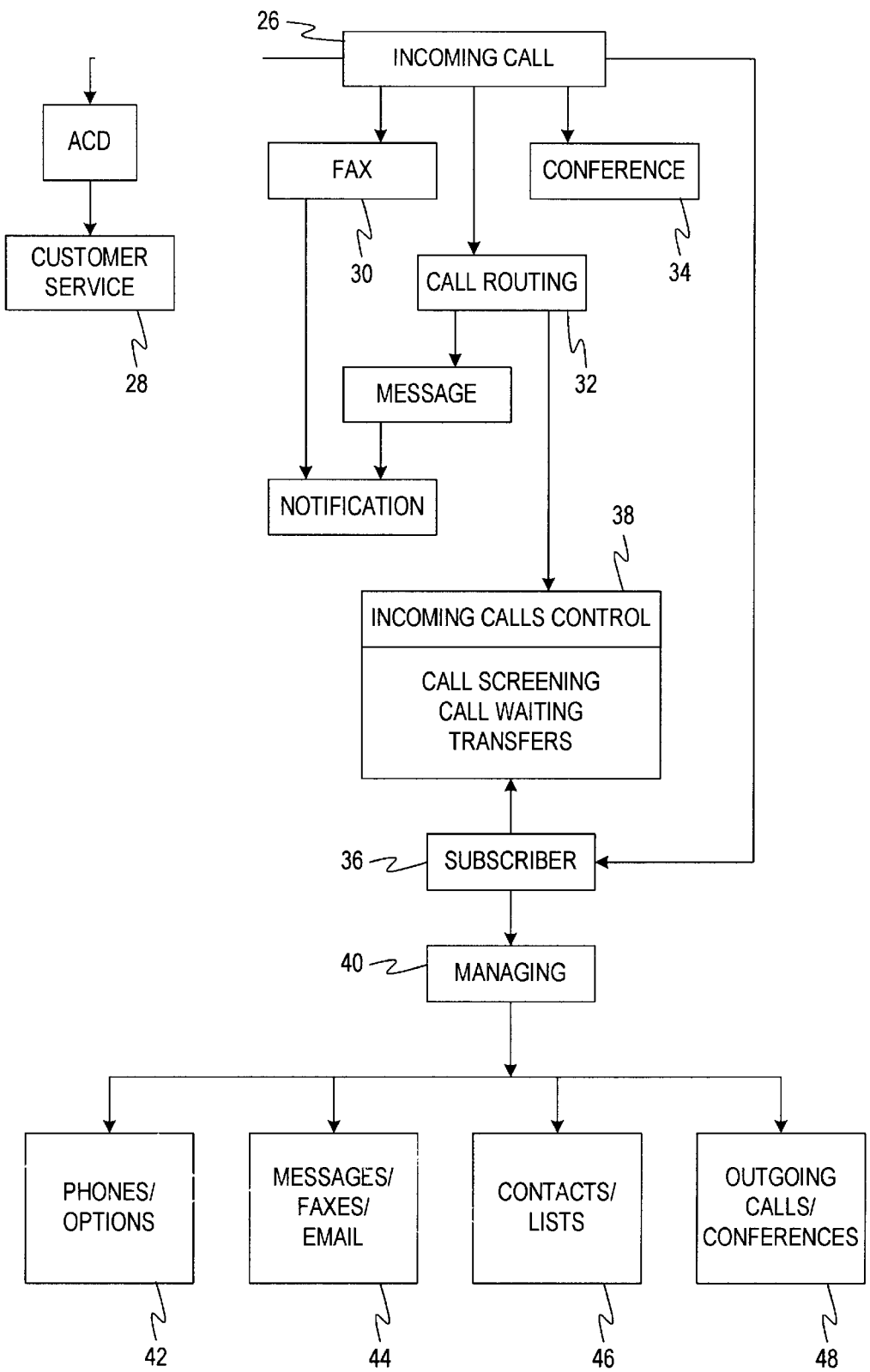
FIG. 3 is a general application flow chart embodying the present invention.

FIG. 3 shows a general application flow chart for an incoming call 26 to the system. The incoming call 26 whether by telephone connection or internet connection is directed either to customer service 28 (through an automatic call distribution-ACD), fax 30, call routing 32, or conference 34 function. Call routing 32 is determined by the incoming call control 38, previously set by the subscriber, and can include a message and notification to the subscriber, call screening, call waiting, and the transfer of the call. Further, if the incoming call 26 is a subscriber 36, the system will provide additional functions to the subscriber, such as controlling incoming calls 38, including call screening, call waiting and transferring calls. The subscriber may set priorities to certain callers allowing only certain callers to reach the subscriber while all others are sent to voice-mail to record a message for playback later.

Also, the subscriber will be able to manage 40 his account. Managing 40 includes setting the options for telephone calls 42, setting the options for sending and receiving messages, faxes and e-mail 44, managing the database containing the subscriber's contacts and other lists 46, and setting the parameters for outgoing call and setting up conferences 48.

Figure 4A:
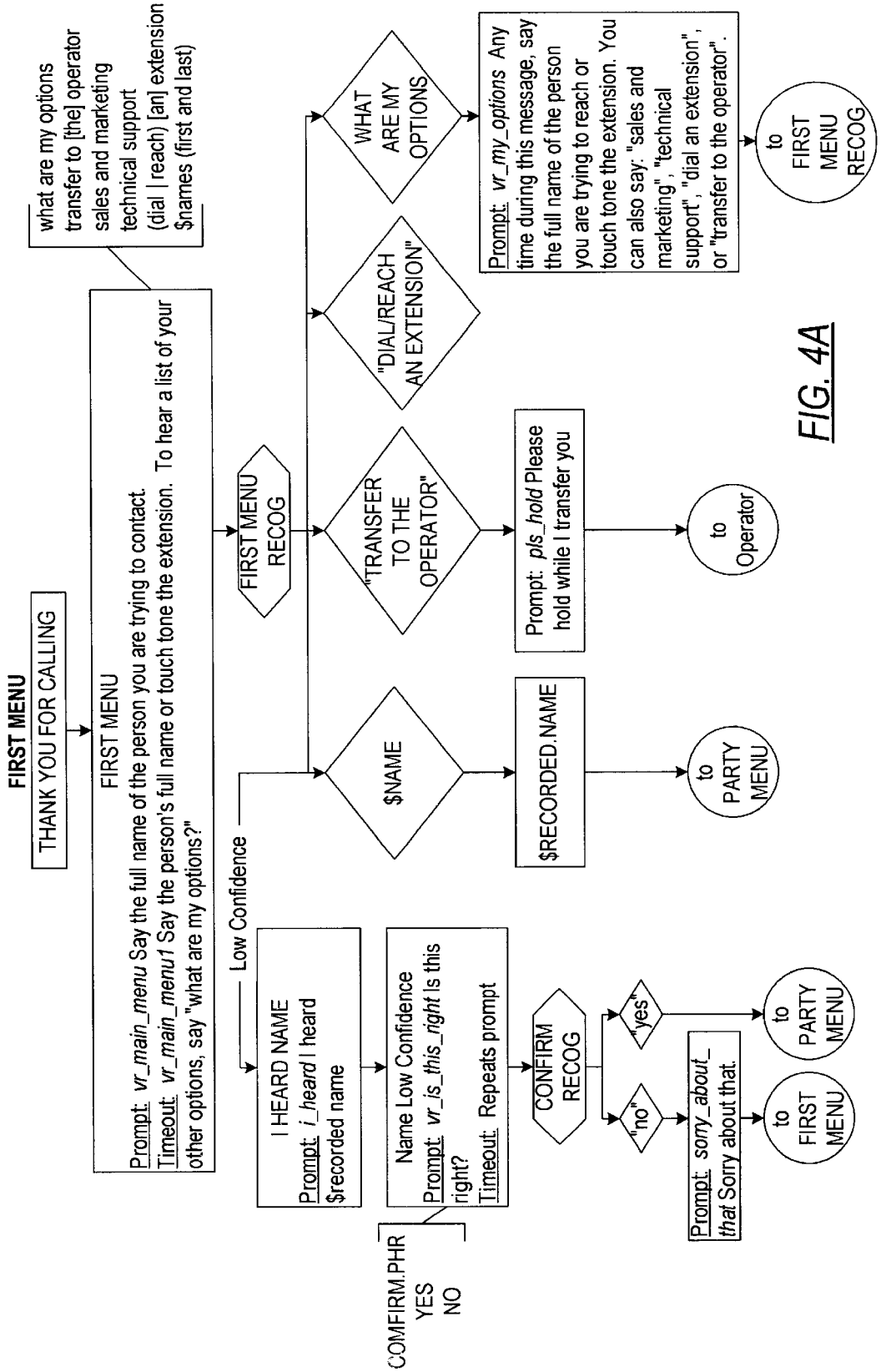
FIGS. 4A–4R are detailed application flow charts embodying the present invention.
Figure 4B:
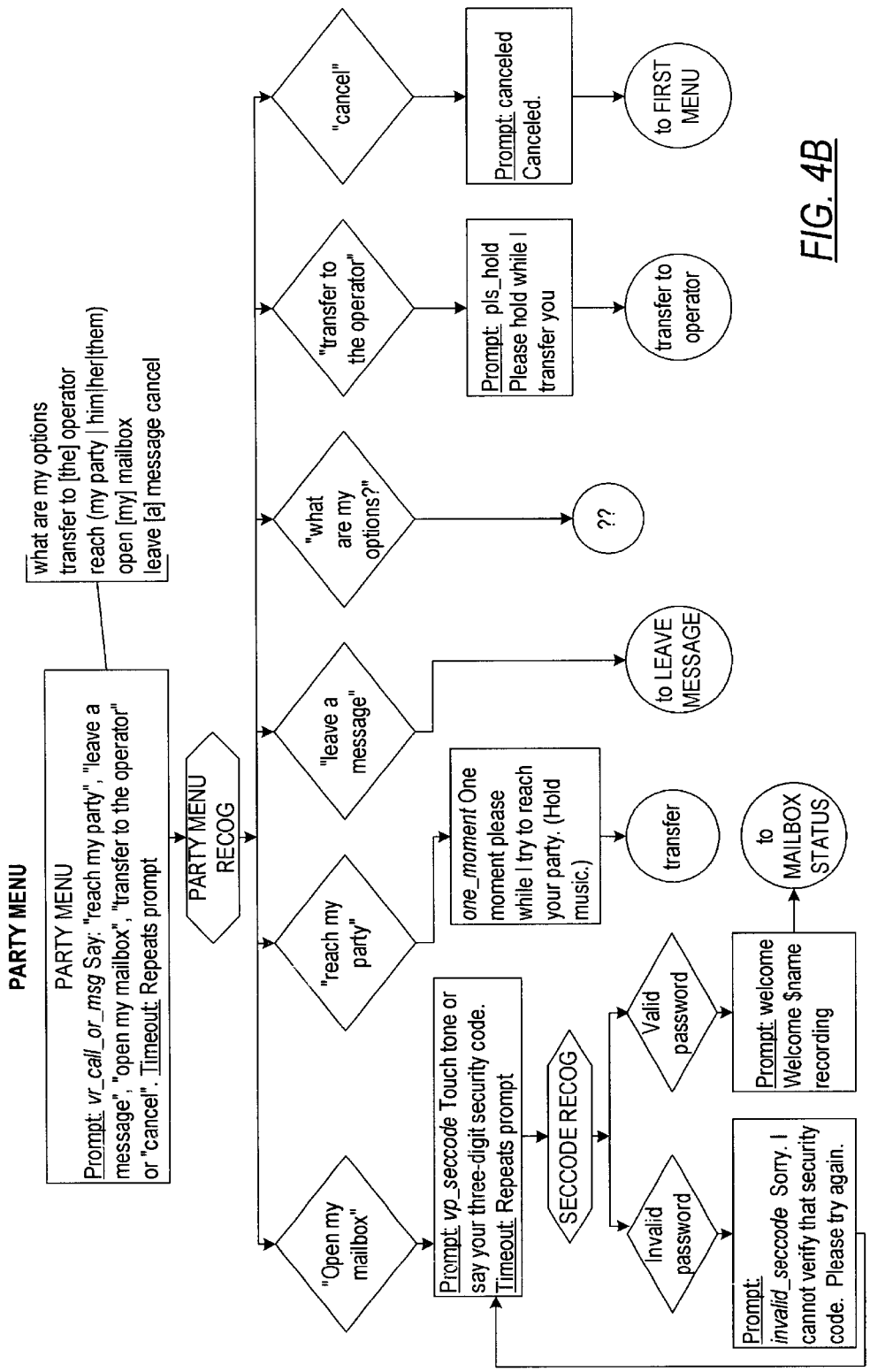
Figures 1, 4C:
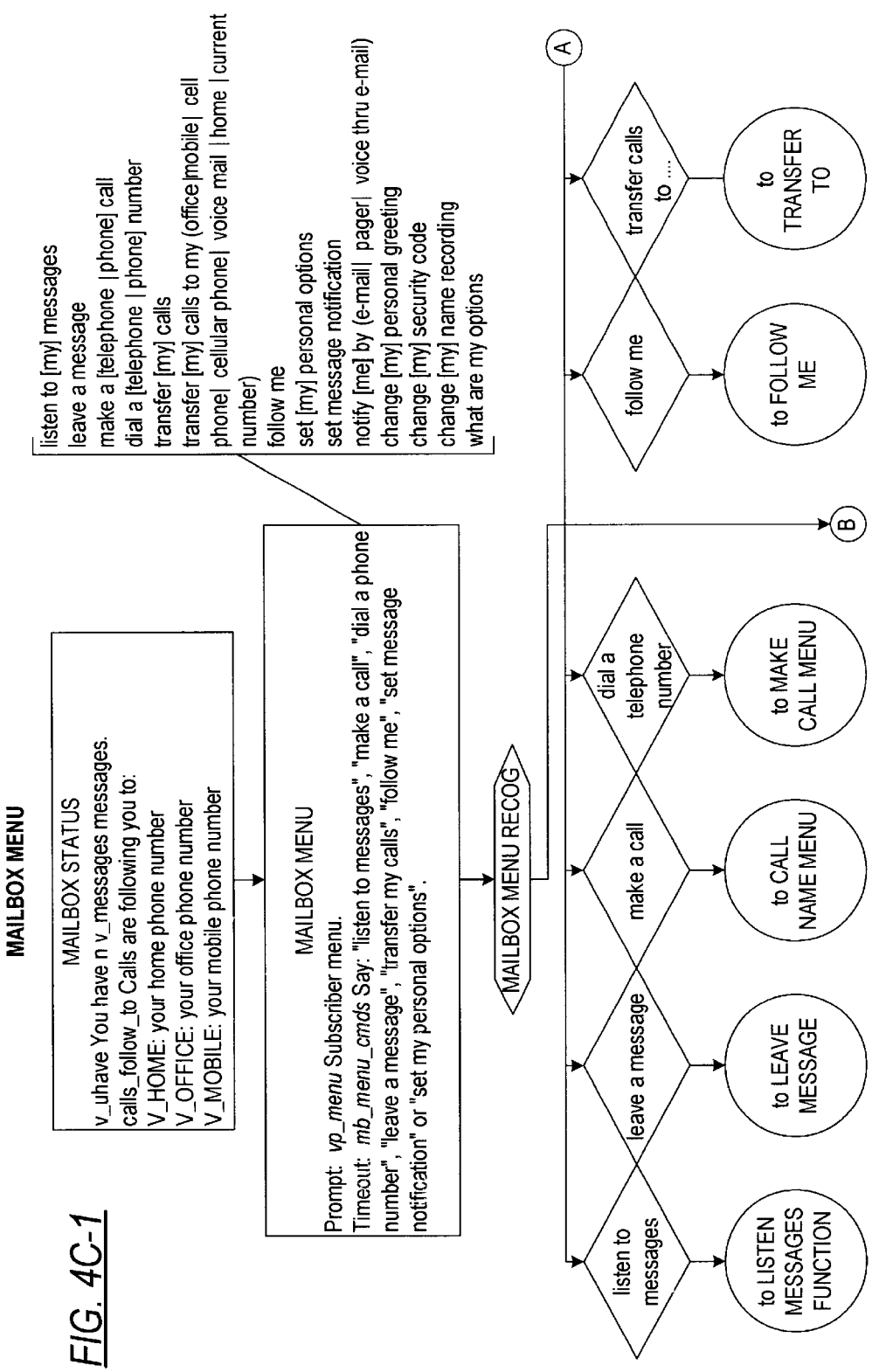
Figures 2, 4C:
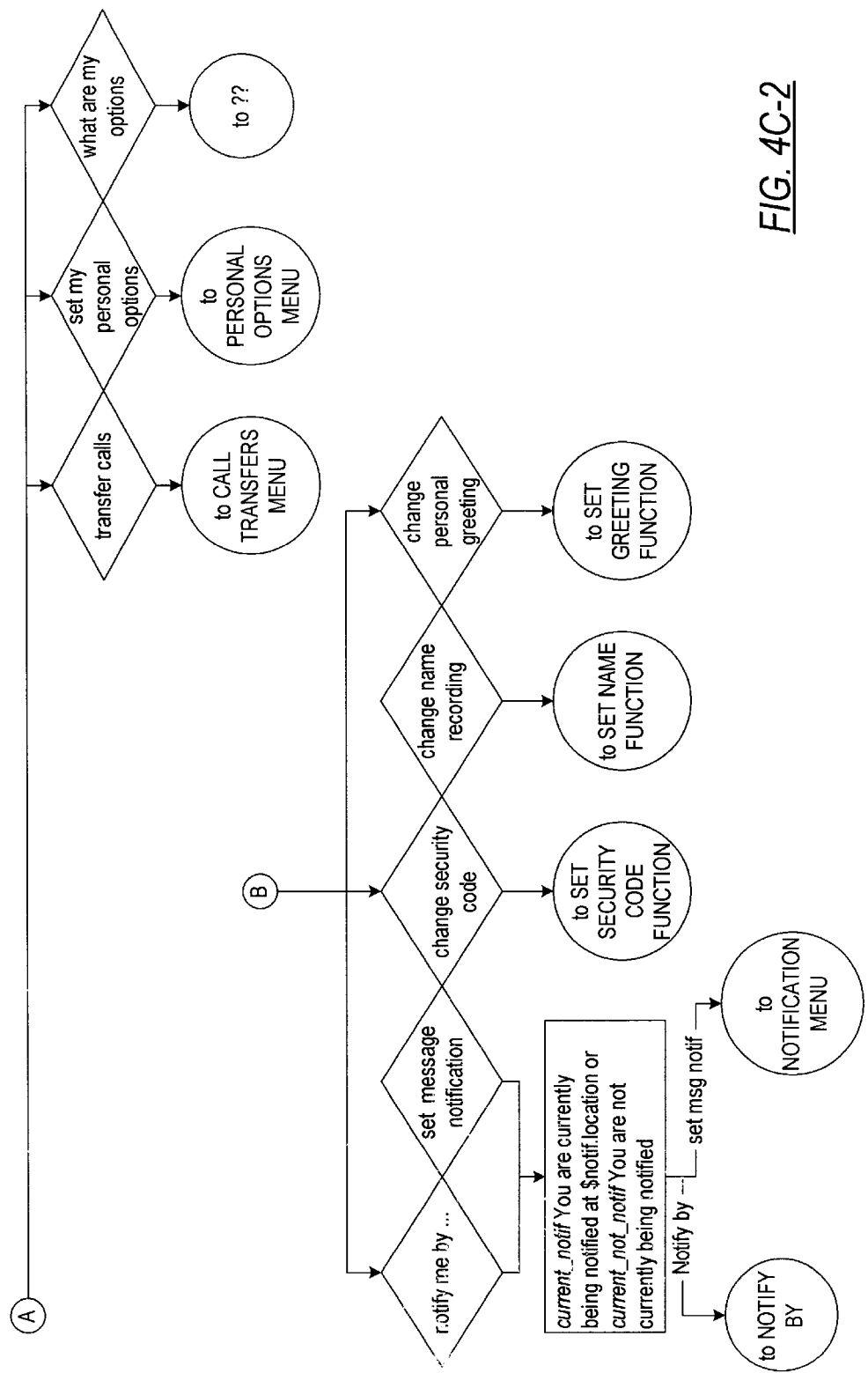
Figure 4D:
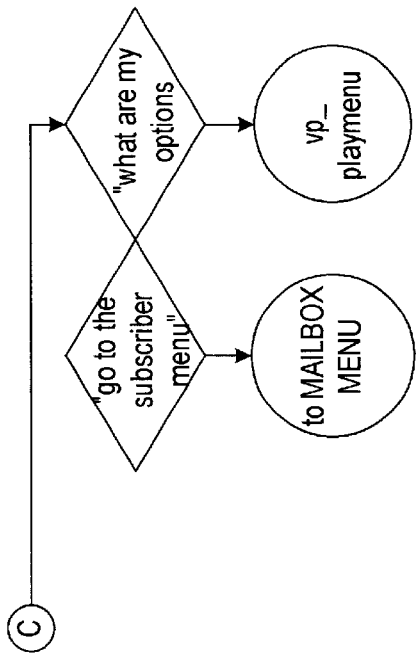
Figure 2:
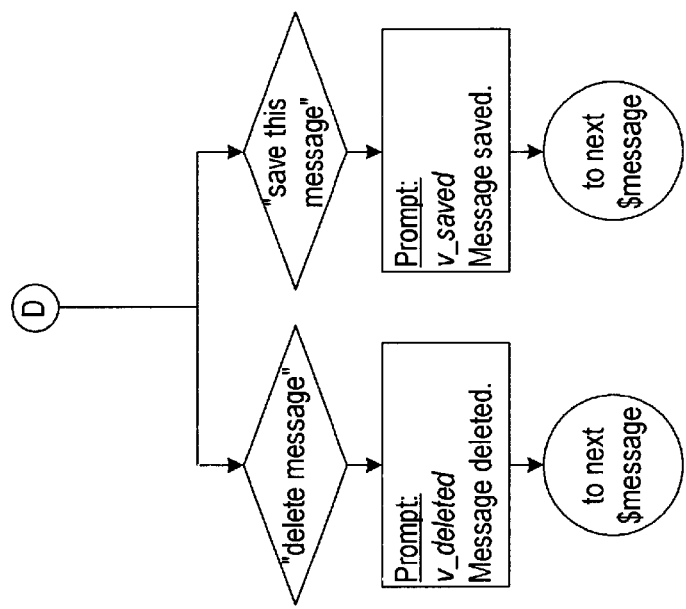
Figure 4E:
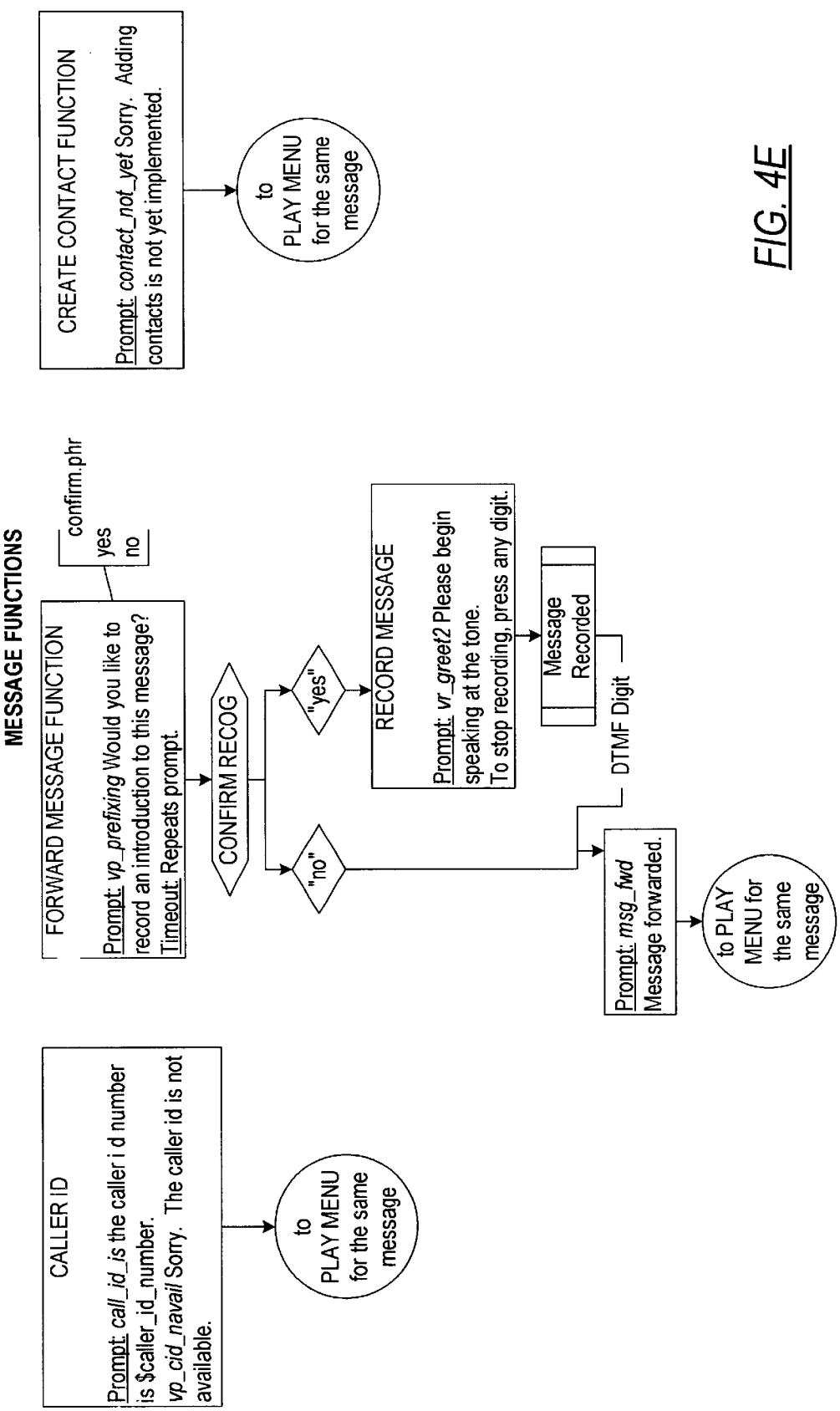
Figure 4F:
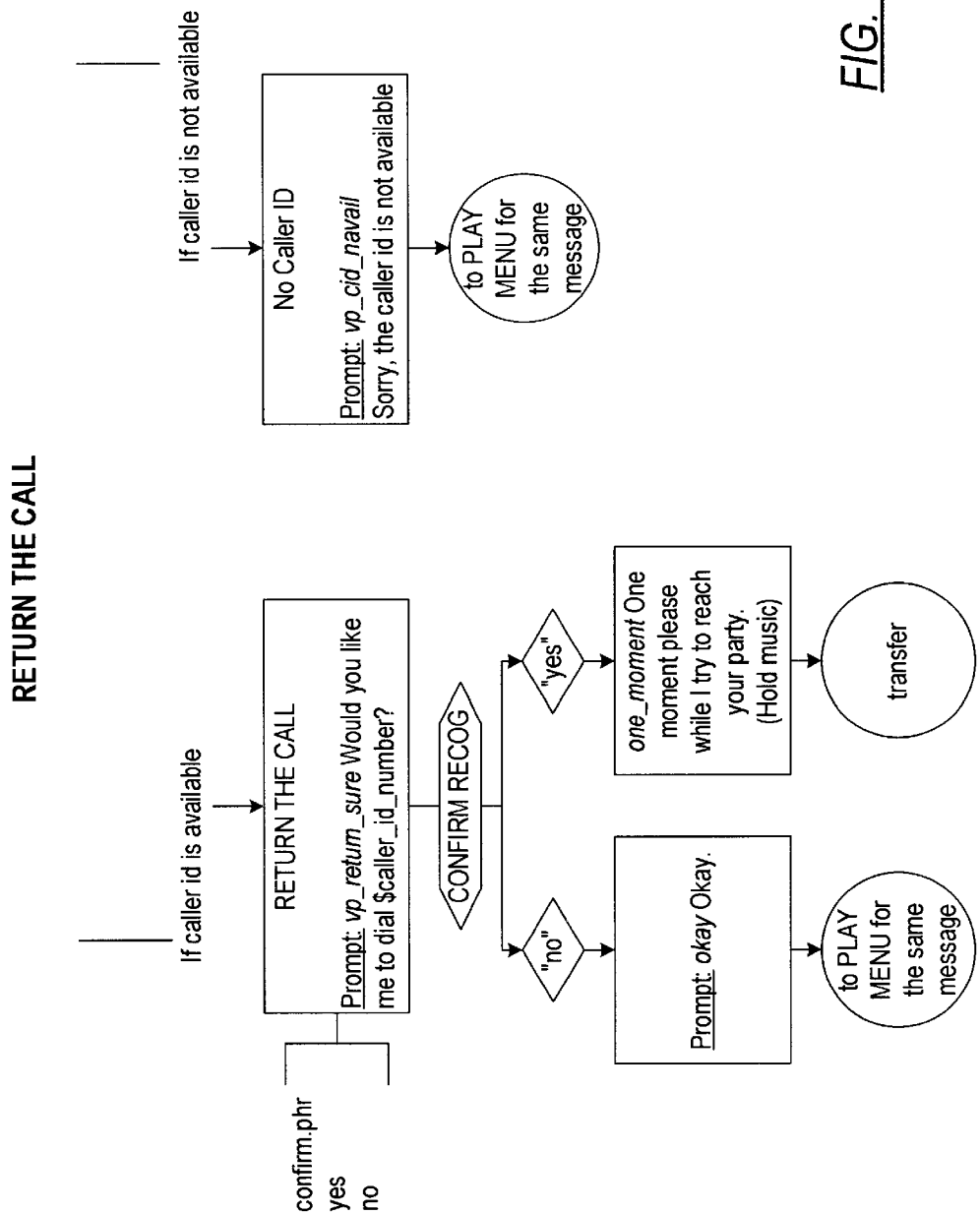
Figure 4G:
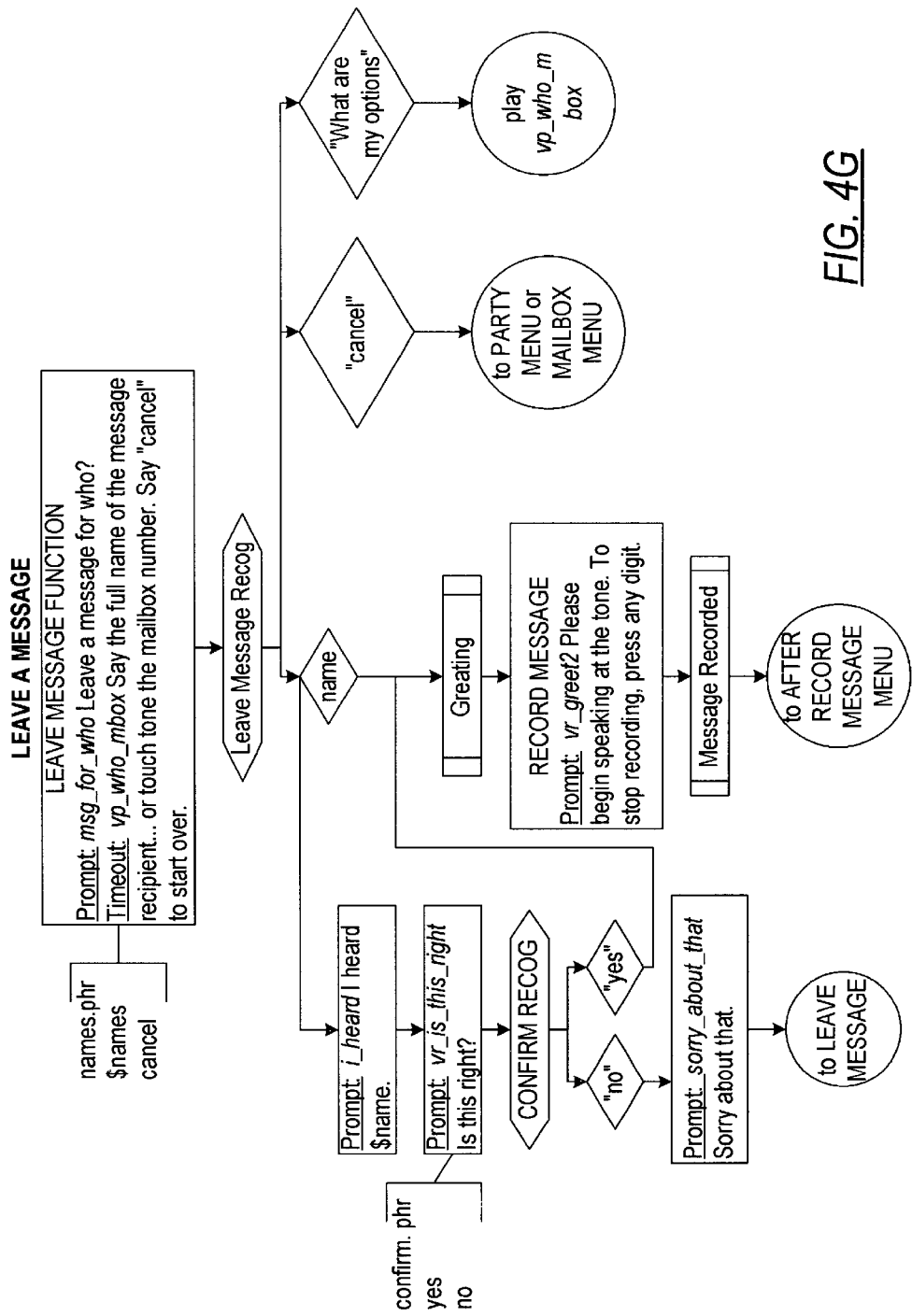
Figure 4H:
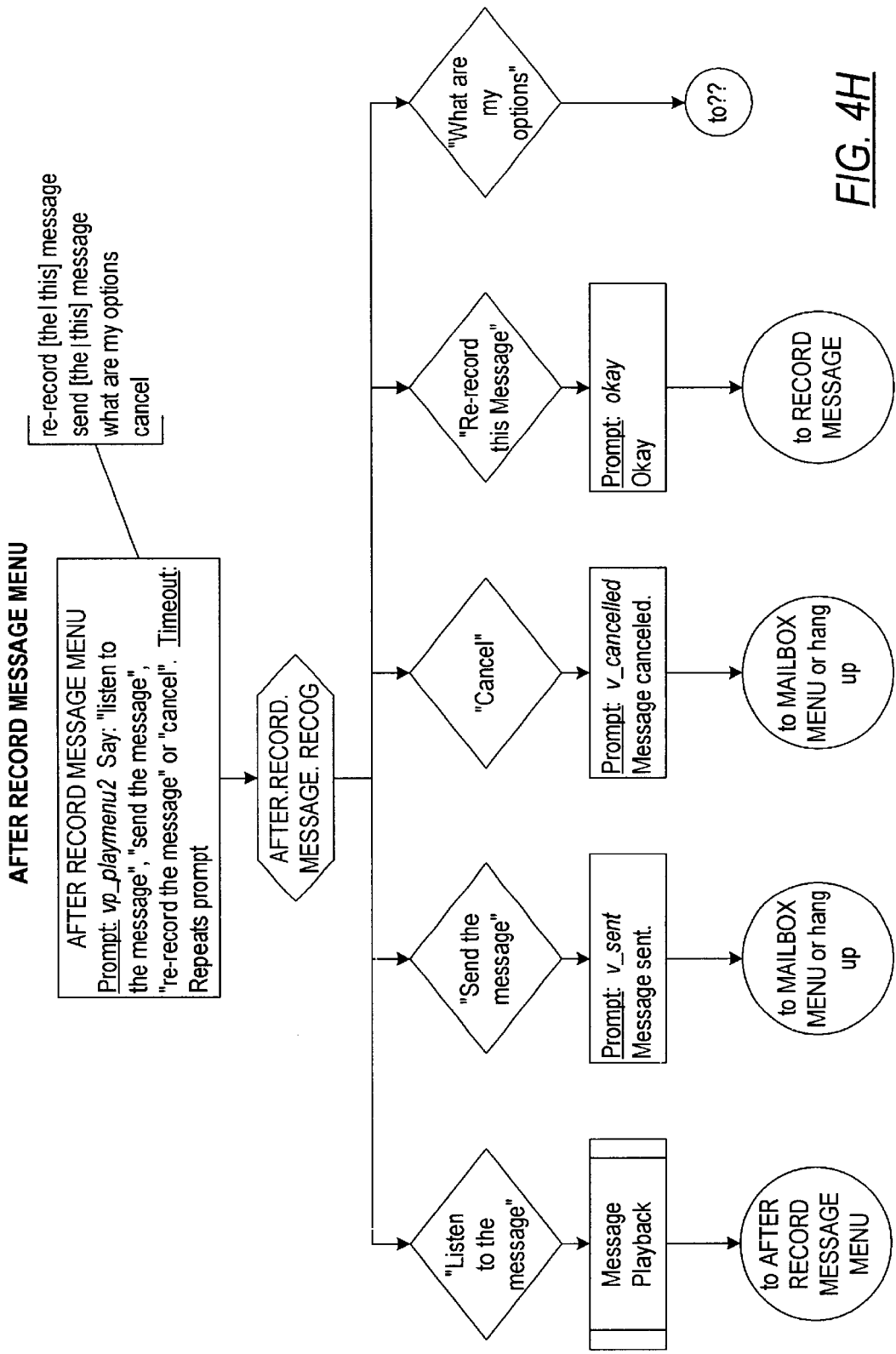
Figure 4I:
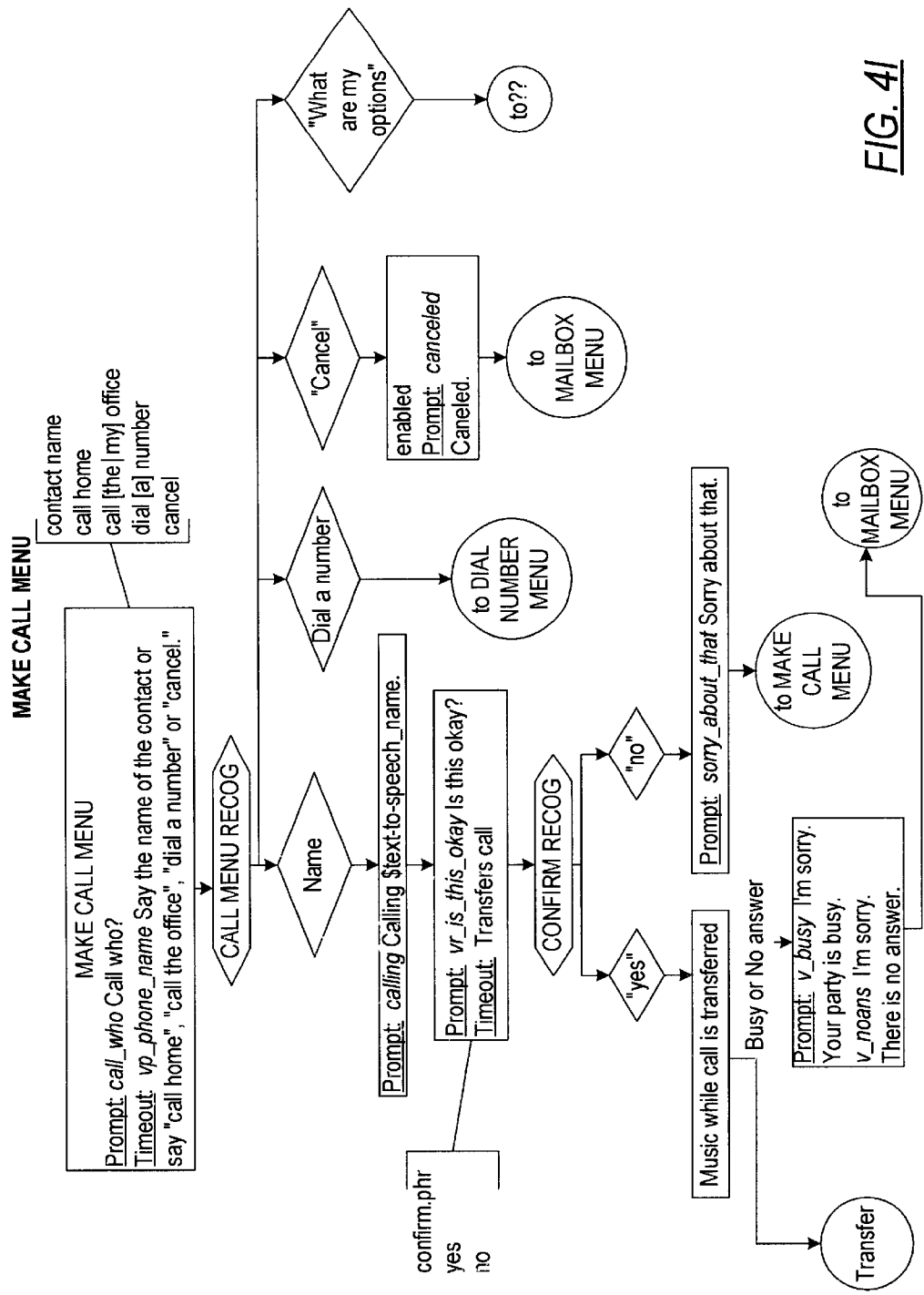
Figure 4J:
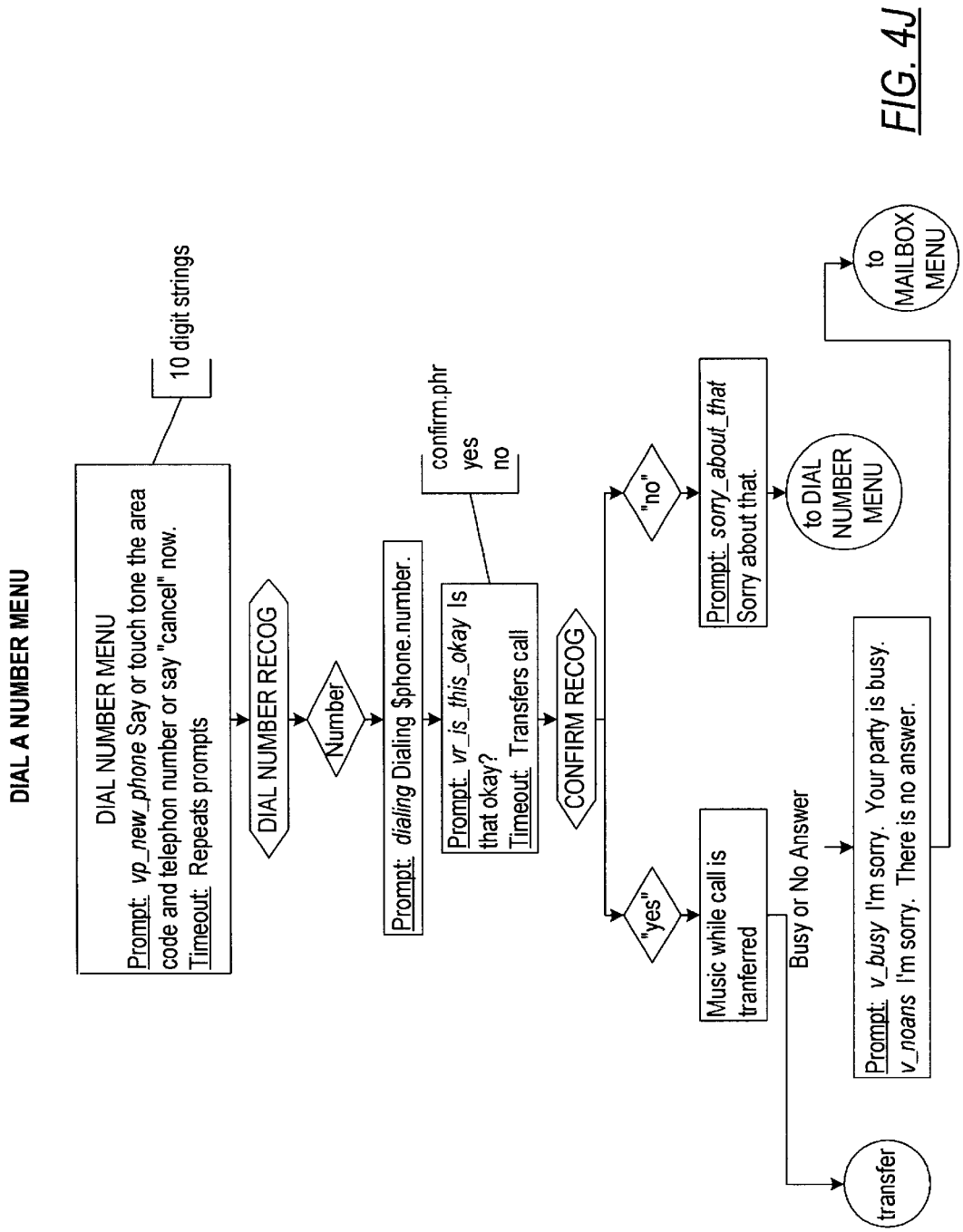
Figure 4K:
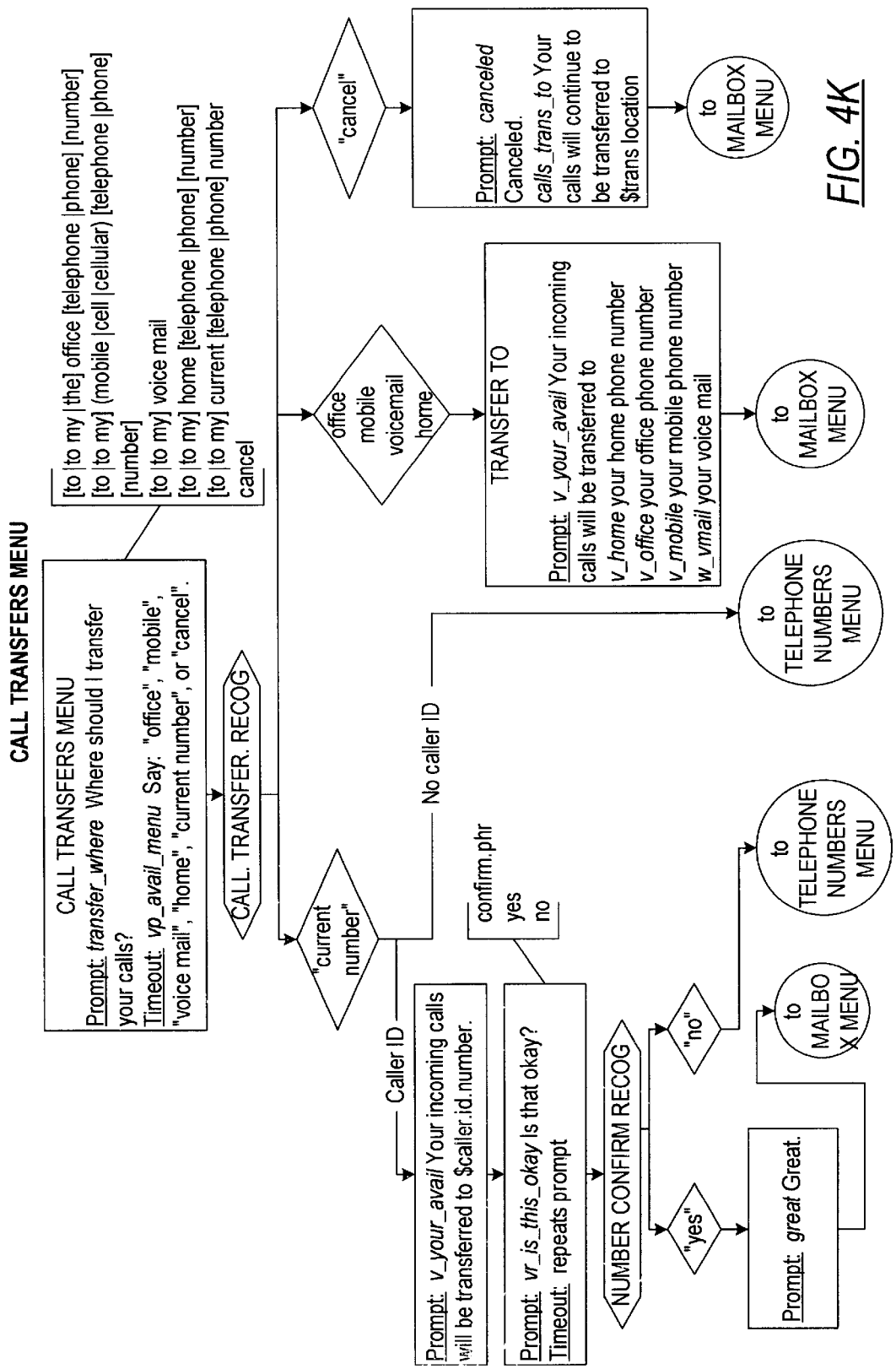
Figure 4L:
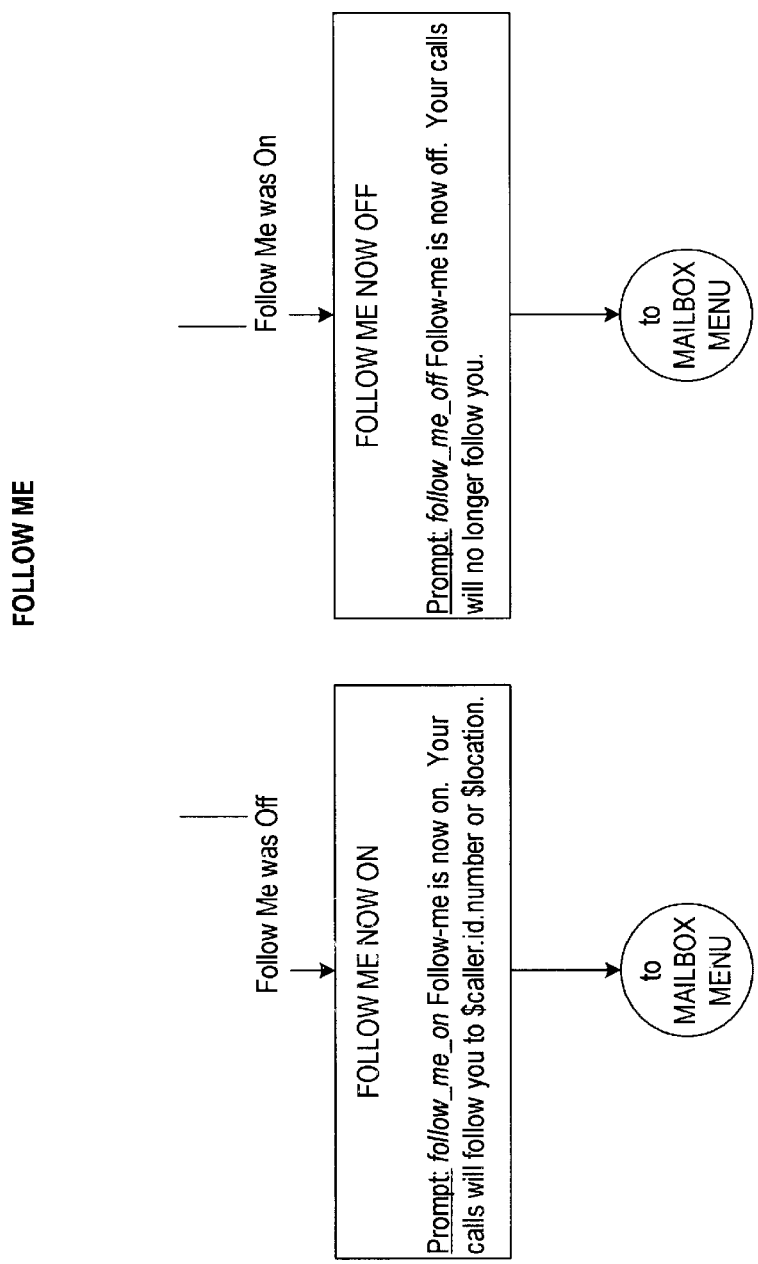
Figure 4M:
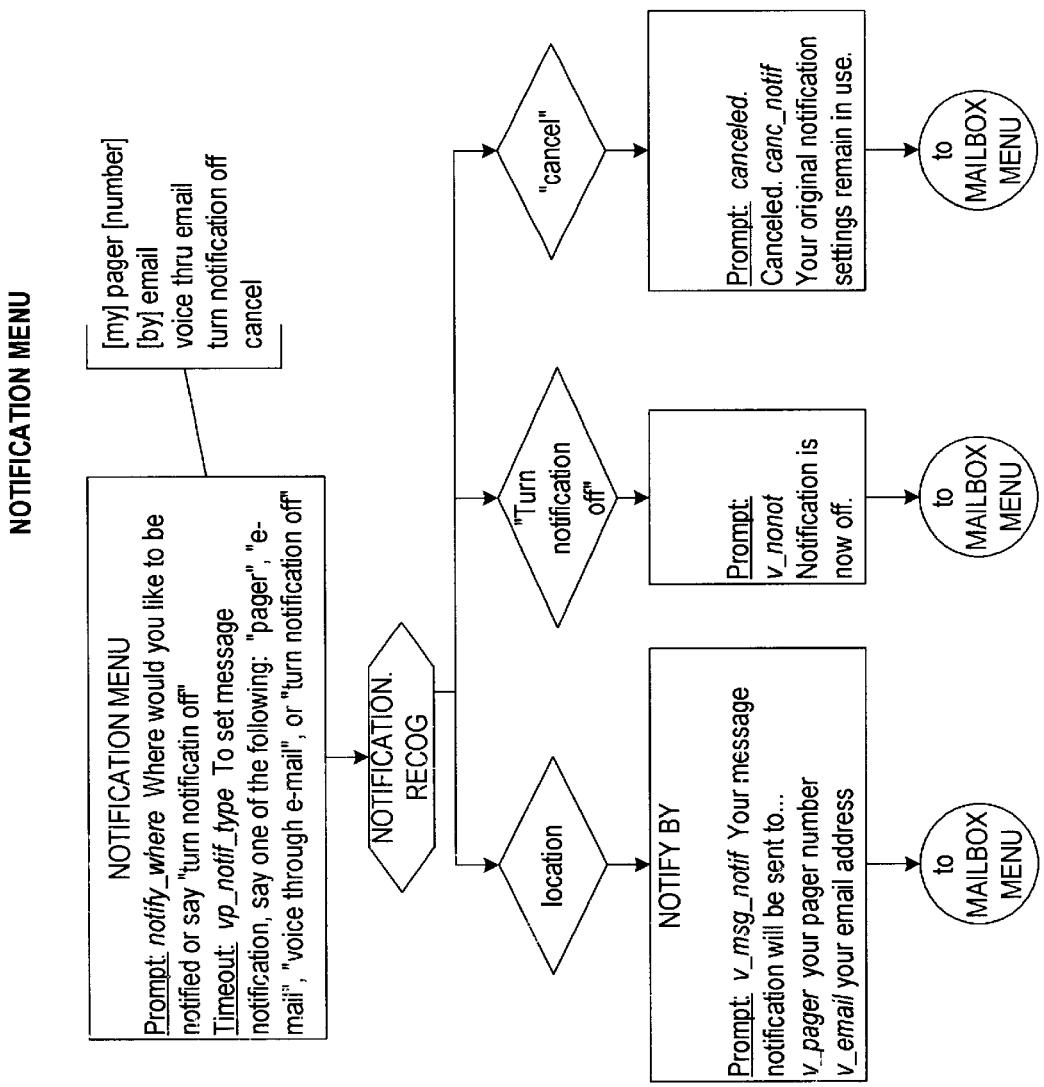
Figure 4N:
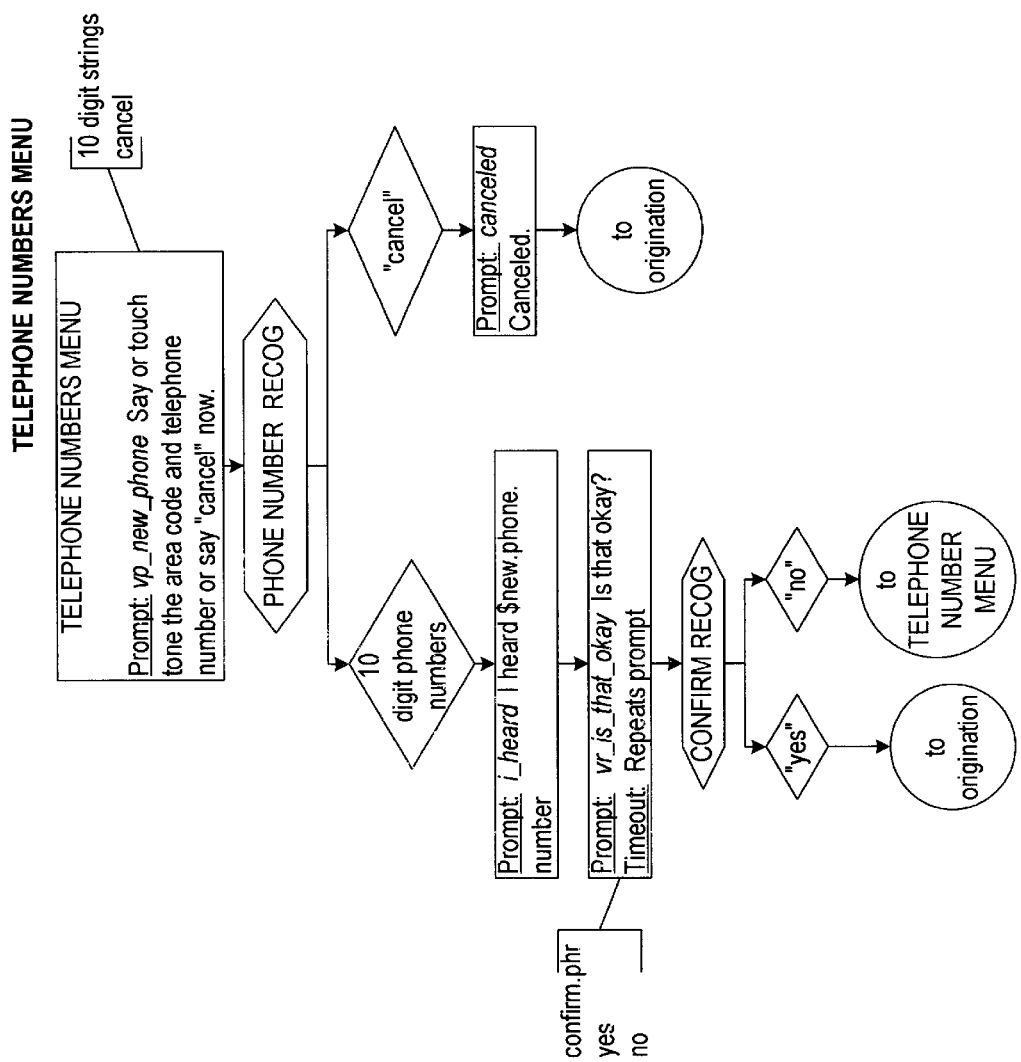
Figure 40:
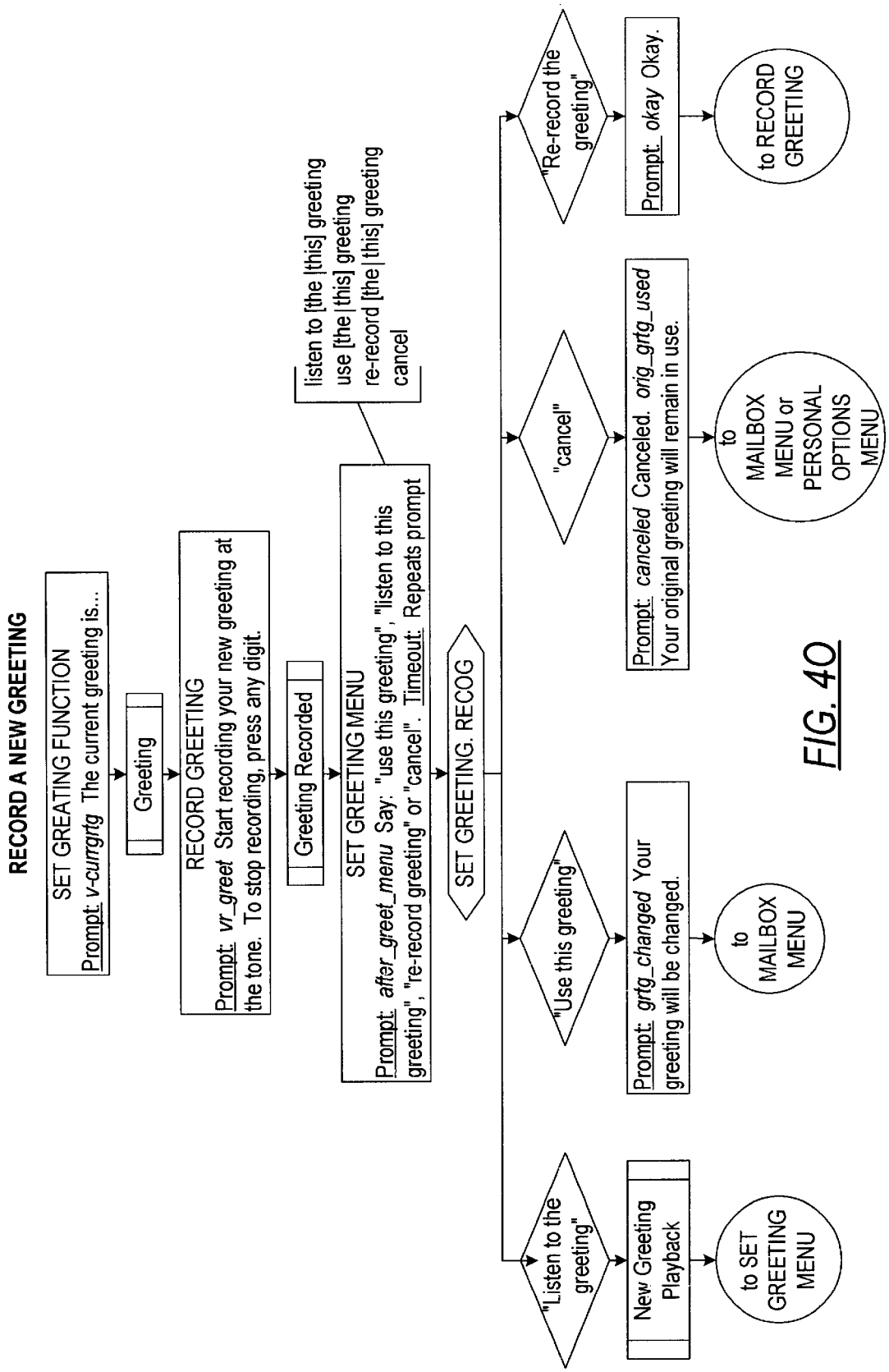
Figures 2, 4P:
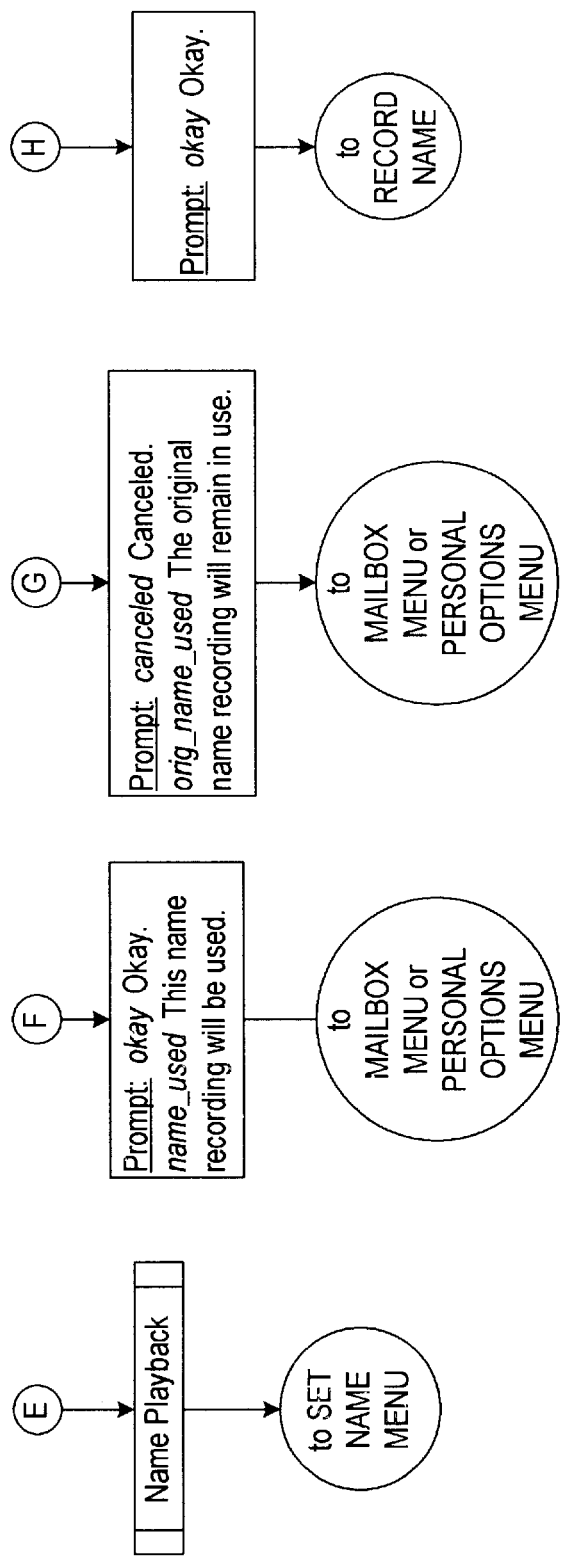
Figure 4Q:
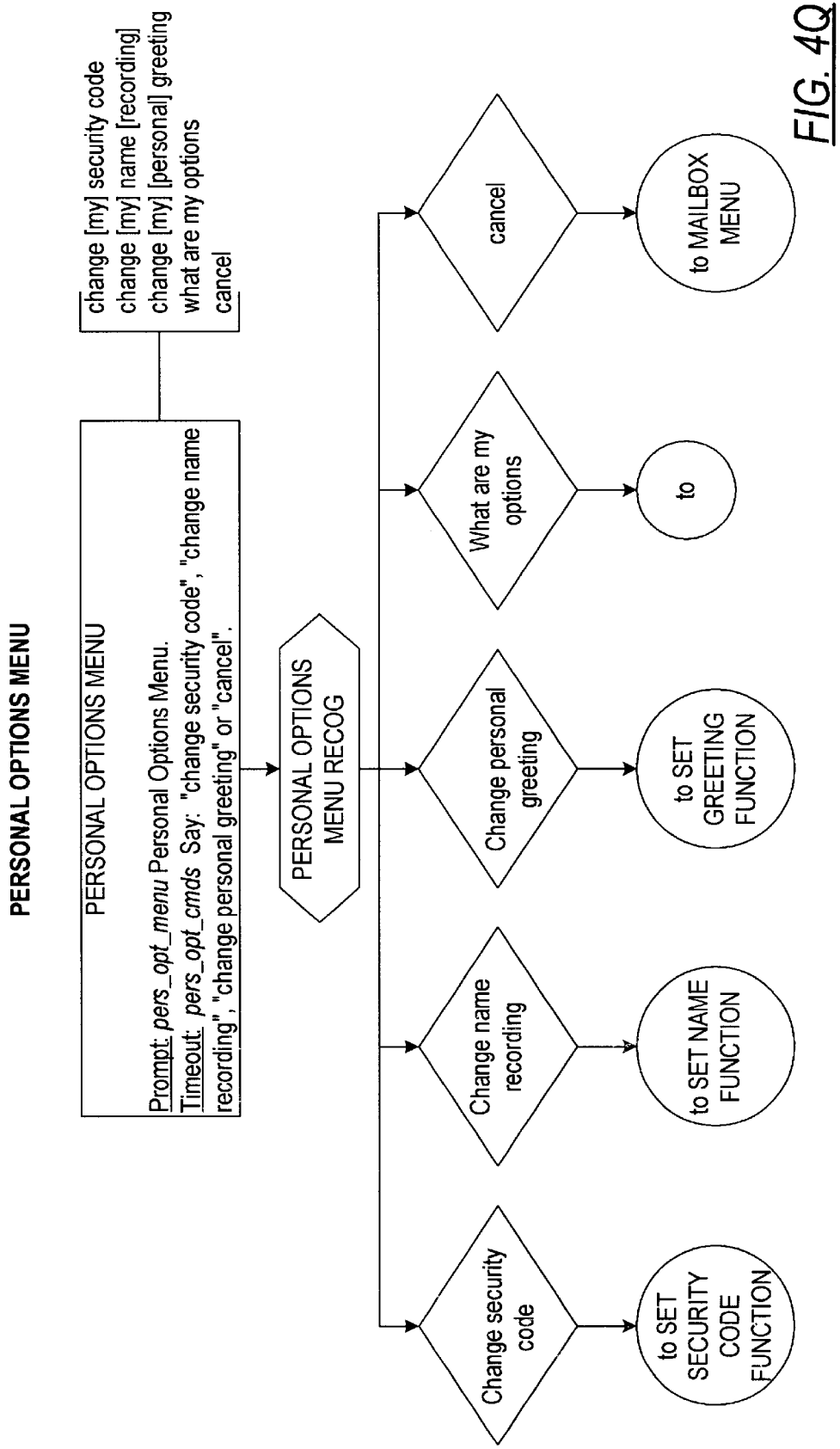
Figure 4R:
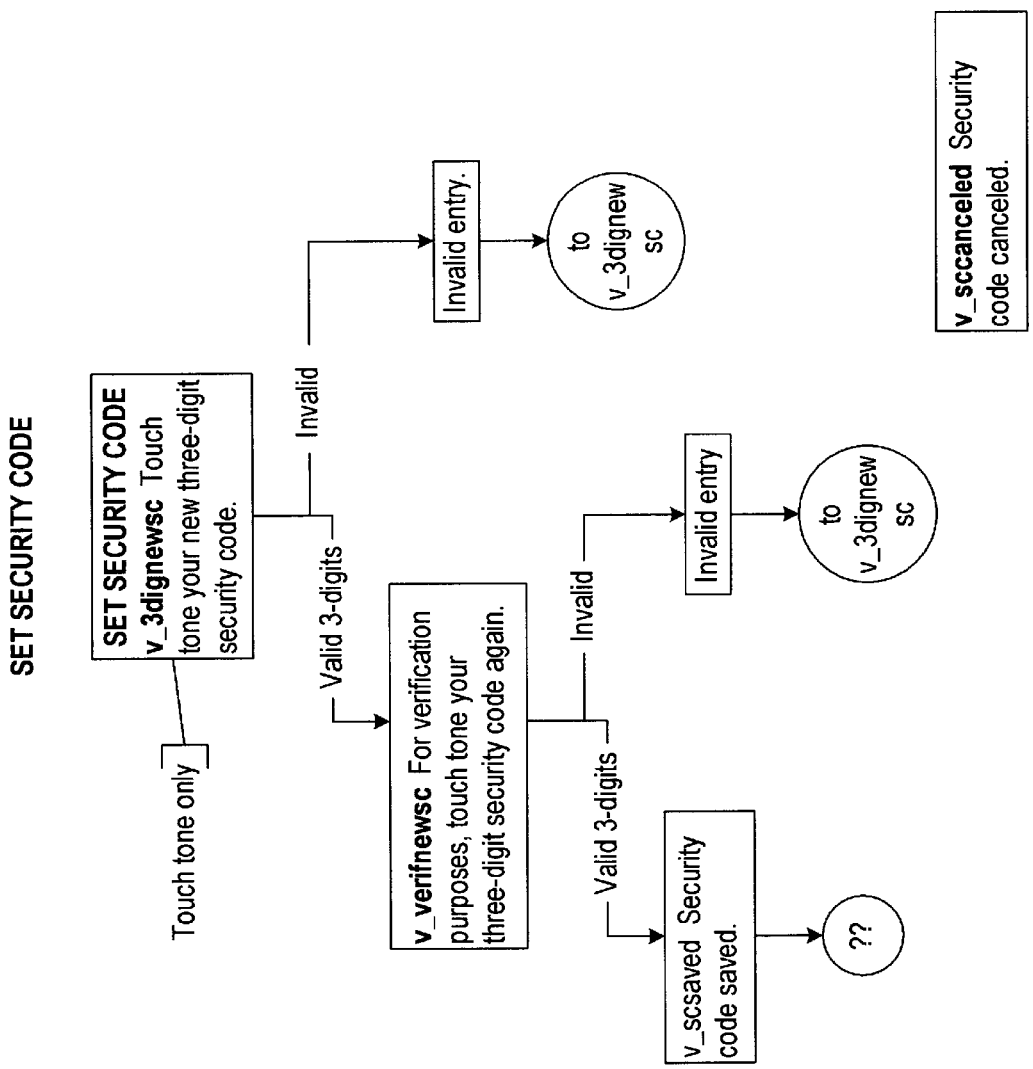

FIGS. 4A through 4R show a more detailed flowchart of the present invention. FIG. 4A shows the First Menu encountered by a subscriber or an individual calling the system's 800 telephone number. The caller is explained the different options and then the system, if requested, attempts to recognize the subscriber or party's name or extension that the caller is trying to reach.

FIG. 4B shows the Party Menu which allows the caller to begin the transfer to the party he is trying to reach, leave a message, or, if the caller is a subscriber, open his mailbox. FIG. 4C shows the Mailbox Menu which allows the subscriber to listen to his messages, leave a message, make a call (using the database), dial a telephone number, request the system to follow the subscriber, transfer calls, and set other personal options, including the greeting, security codes, etc.

FIG. 4D shows the Listen to Messages Menu which allows the subscriber to listen to, forward, or return the message, along with other options such as adding a contact, etc. FIG. 4E shows the Message Menu such as forwarding the message, providing caller identification information, and updating the contact database.

FIG. 4F shows the Return a Call Menu which will attempt to use caller identification to return the call.

FIG. 4G shows the Leave a Message Menu which allows the caller to leave a message to the intended party. FIG. 4H shows the After Record Message Menu which allows the caller to listen to the message, re-record the message, send the message, or cancel the message. FIG. 4I shows the Make Call Menu which allows the subscriber to dial a number, cancel, or attempt to obtain a contact and transfer to that contact.

FIG. 4J shows the Dial a Number Menu which allows the subscriber to dial a telephone number. FIG. 4K is the Call Transfers Menu which allows the subscriber to transfer incoming calls to either his caller identification, a telephone number, or some other number of choice. FIG. 4L is the Follow Me Menu which allows the subscriber to receive calls wherever he may be located. FIG. 4M shows the Notification Menu which allows the subscriber to be notified either by pager or e-mail in certain situations. FIG. 4N shows the Telephone Numbers Menu which allows the subscriber to dial a telephone number either by depressing the telephone keypad or speaking the number.

FIG. 4O shows the Record a New Greeting Menu which allows the subscriber to record, listen, or re-record a greeting which a caller will hear upon reaching the subscriber. FIG. 4P shows the Name Recording Menu which allows the subscriber to set a particular name in the system. FIG. 4Q shows the Personal Options Menu which allows the subscriber to change the security code, the name recording, and the personal greeting. FIG. 4R shows the Set Security Code Menu which allows the subscriber to set a new security code.

Figure 5A:
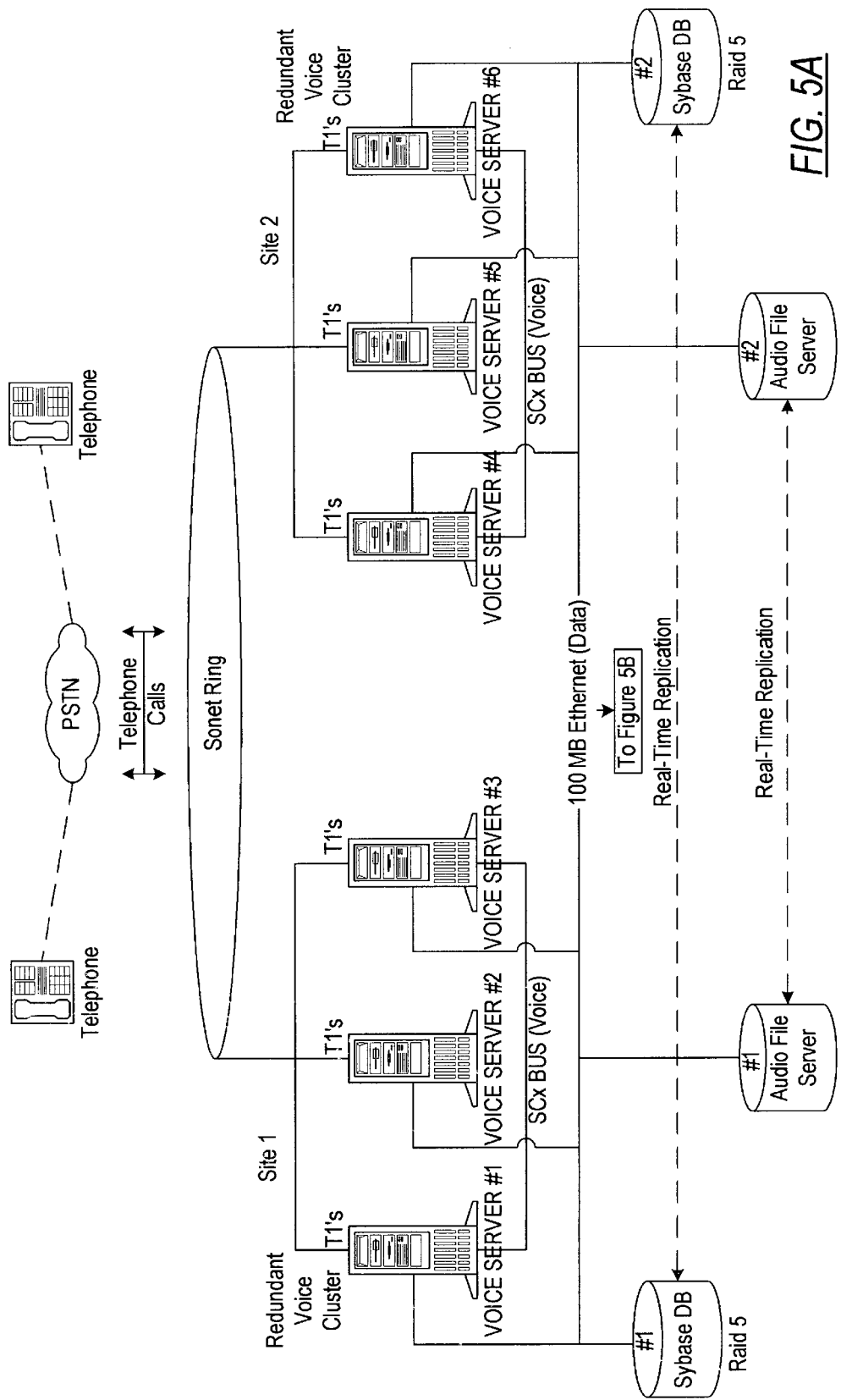
FIGS. 5A–5B are the functional block diagrams for the computer telephony platform and network architecture embodying the present invention.
Figure 5B:
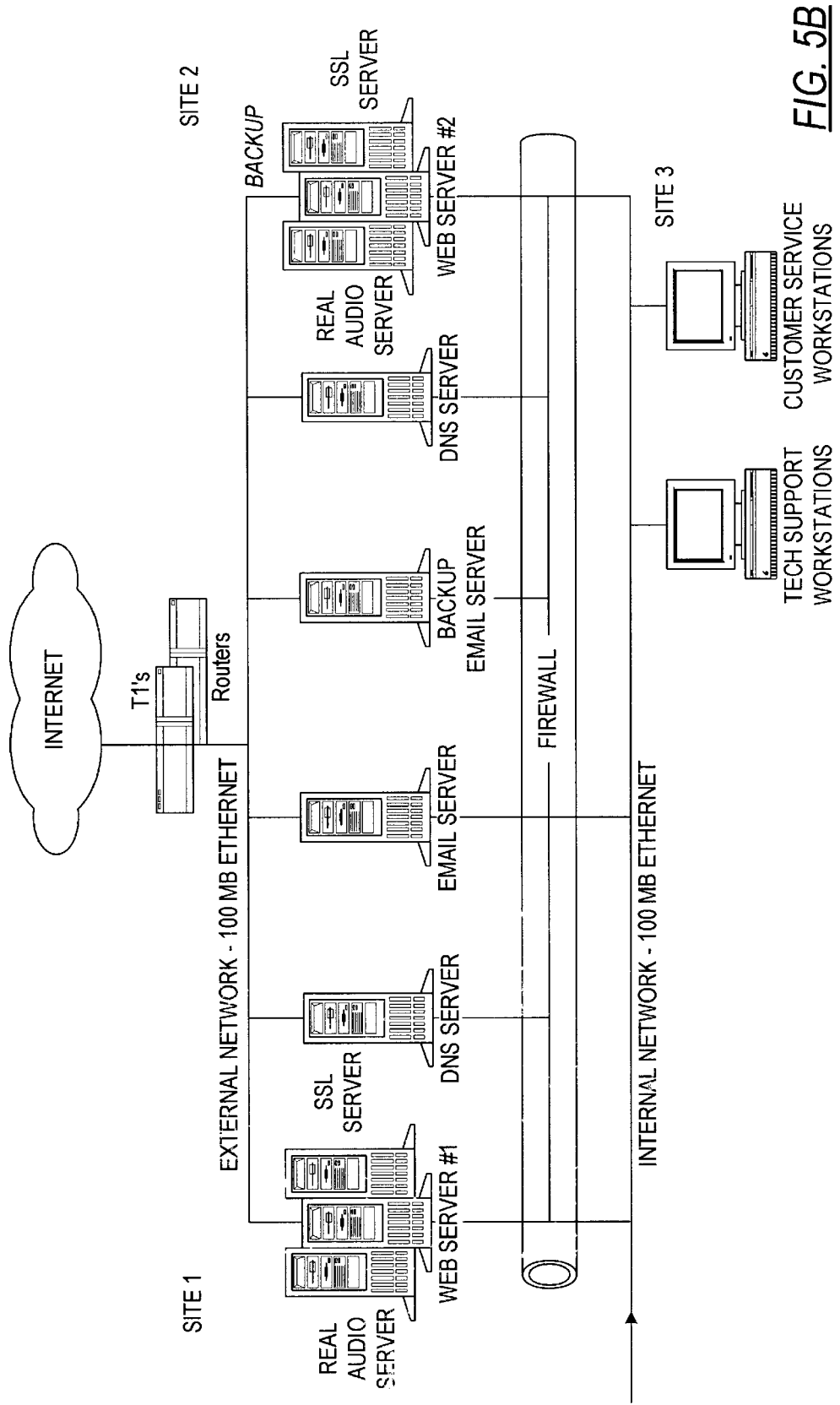
Figure 6:
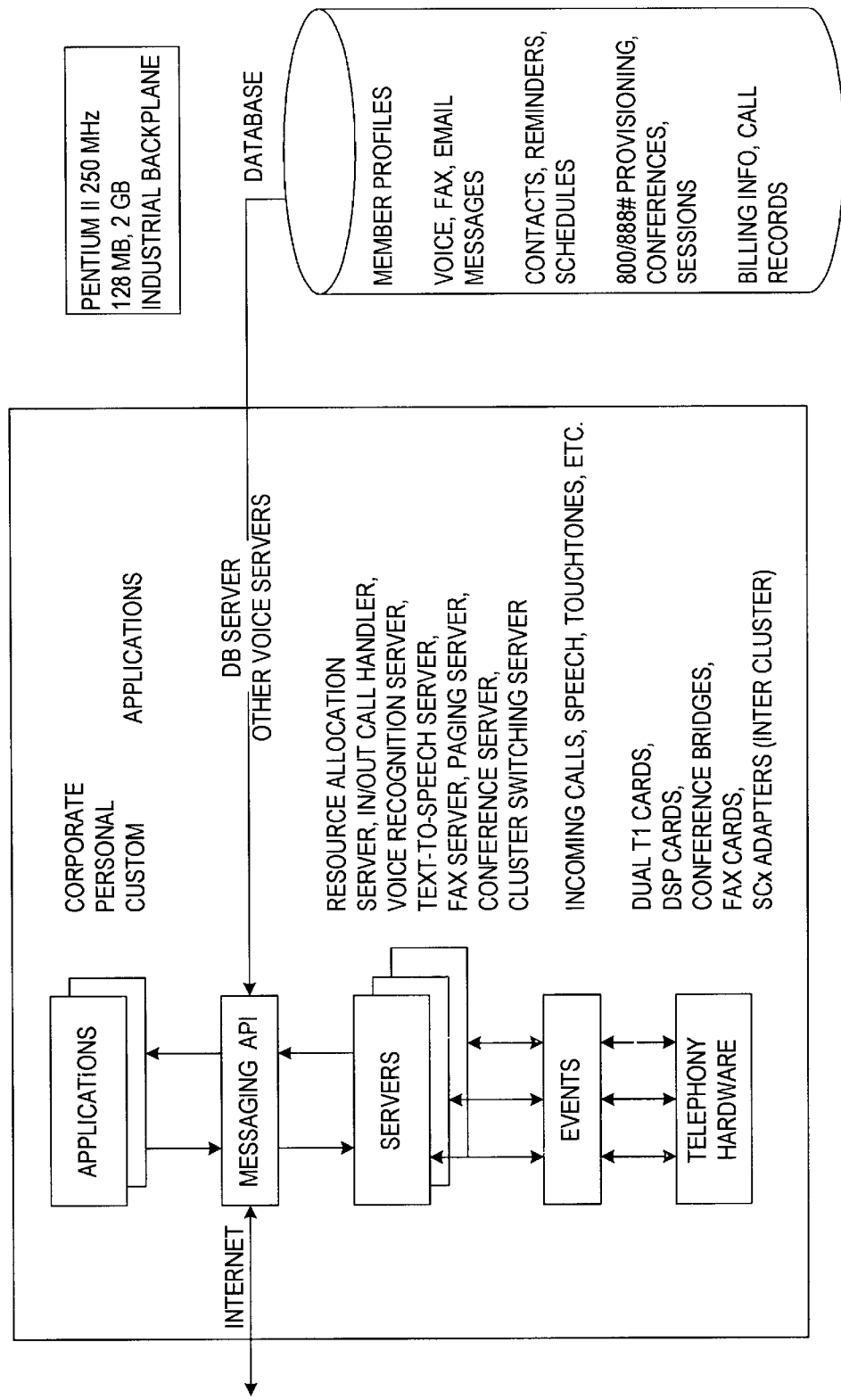
FIG. 6 is the software architecture embodying the present invention.

FIG. 5A shows the computer telephony platform in accordance with FIG. 1 in more detail. FIG. 5B shows the network architecture in accordance with FIG. 2 in more detail. FIG. 6 shows the software architecture utilized in the present invention.

The system provides three ways for the subscriber to handle his communications. First and foremost is the voice recognition software using natural voice recognition (phonemes based), not pattern based as many of the current systems utilize. Therefore, the system does not have to be trained to identify your voice. Second, the subscriber may use the standard telephone touchtones. And third, the subscriber can utilize the internet to access a secure web site.

The system can act as a "follow me" service, capable of tracking you down whether you're at home, the office, airport, in a hotel room, in another office or in your car. The subscriber can configure the system to follow him, or the subscriber can disengage the follow me with a simple command. It also lets you know who is calling before you accept the call.

As for Web connections, you can boot up your computer, sign onto the internet, go through the system's secure web site and play your voice mails, read your email and faxes, manage your contacts and schedule conferences. The website thus becomes a unified messaging system. If you get a message from somebody who's not in your address book and you want to call him or her, you just go to the web site again and add a contact.

If you're on the secure website and you walk away, the system even times out after a few minutes so no one can sit at your computer and obtain your messages and contacts without your permission.

While on the system's web site, you'll be communicating over the internet via the Secure Socket Layer (SSL), a transport level technology (developed by Netscape) for authentication and data encryption between a Web server and a Web browser. SSL sends data over a "socket," a secure channel at the connection layer existing in most TCP/IP applications.

The system also utilizes text-to-speech so you can listen to your e-mail over the phone, or the subscriber can display his e-mail on his computer where he can reply to it and send e-mail to his contacts with audio (using audio attachments). Further, using Vosaic's internet audio program, the system can deliver voice mail via streaming audio over the internet using Java without a plug-in.

During a session on the web site, using text-to-speech, you could type in a name like "Harry Newton" and his phone number so that, when you eventually use the system the phone and you say, "call Harry Newton at the office," the system will recognize the name and dial the number you keyed in previously. Based on what you input now ("Harry Newton") is what the system utters later and compares the phonemes of what you input now to what you'll be speaking later.

The system also facilitates conference calls by allowing the subscriber two ways in which to set up a conference call. First, inbound conference calls can be set up for 32 people if you've registered a pre-scheduled meeting time. Subscribers call in to the system to get an assigned conference number. The conference participants then call in and asks to "join the conference". The system then asks for a conference number, which is entered via touchtones. All the parties are then connected and the conference begins.

Second, outbound conference calls can also be set up, even if you're "on the fly." Whether you're at your desk, at a hotel or even a phone booth, you can simply dial up and tell the system to "set up a conference call." Then you only have to dial up all the various parties to connect each of them to your conference.

The present invention is a compilation of hardware and software, including voice processing using Dialogic's SCSA extended bus and board-level resources, Purespeech speech recognition running on Dialogic Antares boards, and database management using Sybase System 10 and 11. Further, the system utilizes data networking, particularly TCP/IP and distributed systems, object oriented design and programming, multi-processing with Intel hardware, SCO UNIX and Solaris operation systems, Java and JavaScript languages, US and international long distance protocols, internet and web protocols, credit and payment processing, a help desk, customer service system, and network and service management.

For the voice and fax processing servers, the system relies on Dialogic hardware, including, voice boards, Antares cards (for speech recognition and fax) and digital switching cards. The system also uses the SCSA extended bus. The Purespeech ASR algorithms, which are used for speech recognition, run on the Antares cards plugged into the computers running the Solaris OS.

The system combines state-of-the-art speech recognition, computer and telephony technology. Along with the ability to recognize an extensive set of simple, intuitive, speaker-independent speech commands and respond by performing a wide variety of complex tasks. Each subscriber has their own secure Web page on which all the features can be accessed, allowing almost every aspect of the present invention to be maintained on-line.

Subscribers can use voice commands to (1) build, edit and manage their contact lists, (ii) review, play back, read, reply to and/or reroute voice mail and e-mail, (iii) schedule conference calls with 800 number access, and (iv) maintain an itemized calling log listing all calls with a running total of all charges.

The system also transfers calls as instructed or upon command will follow the subscriber according to predetermined contact numbers for office, home, cellular, pager or other designated locations. Every time a subscriber calls in, the system logs the originating number for the inbound call and then uses that number to re-contact the subscriber.

In accordance with the present invention, every subscriber or participant is given their own 800 number that is then used by all contacts calling in to the subscriber. The 800 number can also be used in scheduling conference calls for up to 32 participants on a given day and time. Each participant uses the 800 number and calls in to join the conference call, thereby effecting call conferencing for a fraction of the cost otherwise incurred.

Basically, the system provides a unified solution to the many varied communications and messaging devices used daily by mobile professionals and active consumers with simple voice commands, subscribers can easily access and respond to all of their communications and messaging media in the same session.

The system takes inbound calls and contacts the subscriber, using call transfer or follow me features, and advises the subscriber of the call, the number of the calling party and/or the callers identity from the subscribers contact list. If the subscriber is on the telephone, the system will whisper the pending call information, giving the subscriber the option of taking the call or sending the caller into voice mail. The subscriber can also set priorities for certain calls which the system will follow, permitting selected calls to be put on call waiting, transferred or directed through call forwarding, while other calls are direct to voice mail messaging. Subscribers can conveniently make calls from their contact list by voice commands giving the, contacts name and, if applicable, the location to be called (i.e. "home," "office," "cellular," etc.)

Subscribers can access and play back their voice mail from any telephone or from their personal web page.

Voice mail messages can be saved, retrieved, deleted or rerouted to other individuals, groups or broadcast and voice responses can be returned immediately to the caller. Also, e-mail messages can be viewed on the subscriber's personal home page or the system will read the e-mail to the subscriber from any telephone using text-to-speech technology. Subscribers can immediately respond to e-mail with voice messages, marking, saving or deleting messages during the same session. E-mail messages can also be sent to any fax machine. Further, subscribers can immediately respond to faxes rather than waiting to retrieve copies and delay responses. Incoming faxes are received, the subscriber is notified of the arrival of the new fax, the fax can then be stored for later viewing and/or redirected to any fax machine or email address from the subscribers contact list or any other number. Subscribers can also be notified of any incoming communications and messages by pager, whether an inbound call, voice mail, e-mail or fax.

The system will automate conference calling and eliminate the need for conference call operators or complex, confusing PBX systems. The subscriber remains in control and can add or drop callers, mute the call and otherwise control all aspects of the conference call. By pre-scheduling conference calls by date and time, subscribers can notify participants, giving them an 800 number to call and join the conference. Up to 32 participants can be included in the present conference call feature.

The system further acts as an efficient secretary retaining complete contact logs of all call statistics. The subscriber maintains the contact list using simple voice or keyboard commands and can establish contact groups for broadcast communications and setting up conference calls. The contact database is easily accessible to all features.

The system includes a feature which enables subscribers to retrieve on demand or at predetermined intervals selected information from the internet or online service providers, allowing subscribers to establish "filter and forward" criteria specifying the type of information desired. A search engine will then retrieve the requested information, transmit the information to the system platform and notify the subscriber by page, telephone or other desired means. The system will provide direct access to news, weather, sports, financial, travel and other custom content directly from a computer or any telephone. The subscriber will then access the information by all available options, including text-to-speech capabilities.

The system provides long distance and international calling over the internet through the subscriber's personal home page, thereby significantly reducing the costs of long distance and international calling. The system further provides video conferencing features.

It is to be understood that the form of this invention is merely a preferred embodiment various changes may be made in the fraction and arrangement of parts; equivalent means may be substituted for those illustrated and described; and certain features may be used independently from others without departing from the spirit and scope of the invention as defined in the following claims.

What is claimed is:

1. A system for managing communications and contact information using speech commands indicating specific actions to be performed, said system comprising:
    a database operatively connected with a computer said database containing stored digital-form commands for operating said system;
    a speaker-independent speech recognition device for receiving from subscribers and nonsubscribers speech commands indicating specific actions to be performed, said speaker-independent speech recognition device configured to convert said speech commands to converted digital-form commands;
    said speech commands comprising call routing commands selectable by said subscribers and nonsubscribers;
    a computer operatively connected with said database and said speech recognition device and configured to match said converted digital-form commands with said stored digital-form commands and configured to carry out the specific actions indicated by said speech commands.

2. The system of claim 1 wherein said speaker-independent speech recognition device analyzes phonemes to recognize said speech commands.

3. The communication system of claim 1 wherein said speaker-independent speech recognition device recognizes naturally spoken speech commands.

4. A computer-based communication system connected to a telephone network, said system comprising:
    a database for storing a message received from said telephone network;
    a web server connected to the Internet through said telephone network;
    a speaker-independent speech recognition device for receiving speech commands from subscribers and non-subscribers indicating specific actions to be performed, said speech commands comprising call routing commands selectable by said subscribers and nonsubscribers;
    said speaker-independent speech recognition device configured to recognize said speech commands without being trained by said subscribers and nonsubscribers; and
    said web server being configured to allow said subscribers access to said database via said Internet to retrieve said message and to allow said subscribers to forward, edit or respond to said message based upon said speech commands received by said speaker-independent speech recognition device.

5. The communication system of claim 4 wherein said message stored on said database comprises a voice mail message, an e-mail message, or a facsimile message.

6. The communications system of claim 4 wherein said speech commands are utilized to place telephone calls, to create and send voice mail, e-mail or facsimile messages, or to create or modify conference calls.

7. The communications system of claim 4 wherein said speaker-independent speech recognition device analyzes phonemes to recognize said speech commands.

8. The communication system of claim 4 wherein said speaker-independent speech recognition device recognizes naturally spoken speech commands.

9. A communication system comprising:
    a computer;
    a telephone connection for carrying communications to and from a subscriber and a nonsubscriber and said computer;
    a database connected with said computer;
    an Internet connection allowing said computer to access the Internet;
    a speaker-independent speech recognition device connected with said computer for receiving speech commands from said subscriber and said nonsubscriber requesting information;

said speaker-independent speech recognition device configured to recognize said speech commands without being trained by said subscriber and said nonsubscriber, said speech commands comprising call routing commands selectable by said subscriber and nonsubscriber;

said computer configured to access said Internet connection to retrieve said information from the Internet based upon said speech commands received by said speaker-independent speech recognition device; and a notification message transmitted from said computer to said subscriber or said nonsubscriber indicating that said information has been retrieved.

10. The communication system of claim 9 wherein said computer further comprises a search engine for retrieving said information.

11. The communication system of claim 9 wherein said information comprises news, weather, sports, financial, or travel information.

12. The communication system of claim 9 wherein said speech recognition device recognizes naturally spoken speech requests.

13. The communications system of claim 9 wherein said speech recognition device analyzes phonemes to recognize said speech requests.

14. The communication system of claim 9 wherein said notification message comprises a page.

15. The communication system of claim 9 wherein said notification message comprises a telephone call.

16. A system for handling subscriber communications comprising:

a first site for receiving telephone calls and messages for subscribers;

a second site for receiving said telephone calls and messages for said subscribers;

said second site being redundant to said first site thereby allowing said telephone calls and messages to be received by either of said sites;

a network facility interconnecting said first site and said second site;

a telecommunication facility configured to carry said telephone calls and messages to either said first site or said second site;

said first site comprising a first database and a first computer for routing said telephone calls and messages to said subscribers based upon call control instructions set by said subscribers said by said subscribers;

said second site comprising a second database which is a real-time replica of said first database and a second computer redundant to said first computer for routing said telephone calls and messages to said subscribers based upon said call control instructions; and, wherein additional redundant sites may be added to said network facility thereby increasing the number subscribers supported by the system.

17. The system of claim 16 wherein said telecommunication facility comprises a fiber optic link.

18. The system of claim 16 wherein said telecommunication facility comprises a SONET ring.

19. The system of claim 16 wherein said first computer is further comprised of a speech recognition device.

20. The system of claim 19 wherein said speech recognition device analyzes phonemes to recognize speech commands.

21. The system of claim 19 wherein said speech recognition device recognizes naturally spoken speech commands.

22. The system of claim 16 wherein said second computer is further comprised of a speech recognition device.

23. The system of claim 22 wherein said speech recognition device analyzes phonemes to recognize speech commands.

24. The system of claim 22 wherein said speech recognition device recognizes naturally spoken speech commands.

25. A system for managing communications and contact information using speech commands indicating specific actions to be performed, said system comprising:

a database operatively connected with a computer said database containing stored digital-form commands for operating said system and containing stored contact information;

a speaker-independent speech recognition device for receiving from subscribers and nonsubscribers speech commands indicating specific actions to be performed, said speech commands comprising call routing commands selectable by said subscribers and nonsubscribers;

said speaker-independent speech recognition device configured to convert said speech commands to converted digital-form commands;

a computer operatively connected with said database and said speech recognition device and configured to match said converted digital-form commands with said stored digital-form commands and for carrying out the specific actions indicated by said speech commands, said computer further configured to receive a first communication and to enable said subscriber to access said contact information and said first communication and to edit said contact information and said first communication using said speech commands, said computer further configured to enable said subscriber to create a second communication and to transmit said second communication to a destination selected from said contact information using said speech commands received by said speaker-independent speech recognition device.

26. The system of claim 25 wherein said first communication comprises telephone calls, facsimile messages, voice mail messages, or e-mail messages.

27. The system of claim 25 wherein said second communication comprises telephone calls, facsimile messages, voice mail messages, or e-mail messages.

28. The system of claim 25 wherein said speaker-independent speech recognition device analyzes phonemes to recognize said-speech commands.

29. The system of claim 25 wherein said speaker-independent speech recognition device recognizes naturally spoken speech commands.

* * * * *